United States Patent
Mateer

(12) United States Patent     (10) Patent No.: US 12,430,591 B2
Mateer     (45) Date of Patent: *Sep. 30, 2025

(54) INTEGRATED END-TO-END TRAVEL INSTRUMENT (TI) DEVICE GENERATION SYSTEM AND INTEGRATED TRAVEL INSTRUMENT DEVICES

(71) Applicant: Metropolis Technologies, Inc., Santa Monica, CA (US)

(72) Inventor: Craig C. Mateer, Orlando, FL (US)

(73) Assignee: BAGGAGE AIRLINE GUEST SERVICES, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,145

(22) Filed: Oct. 17, 2024

(65) Prior Publication Data

US 2025/0094886 A1     Mar. 20, 2025

Related U.S. Application Data

(63) Continuation of application No. 18/214,593, filed on Jun. 27, 2023, now Pat. No. 12,124,977, which is a
(Continued)

(51) Int. Cl.
    *G06Q 10/02*     (2012.01)
    *G06K 7/14*     (2006.01)

(52) U.S. Cl.
    CPC .......... *G06Q 10/025* (2013.01); *G06K 7/1413* (2013.01)

(58) Field of Classification Search
    CPC ....... G06Q 10/02–10/025; G06Q 50/14; B64F 1/366; B64F 1/368
See application file for complete search history.

(56) References Cited

U.S. PATENT DOCUMENTS

| 5,920,053 A | 7/1999 | DeBrouse |
| 6,023,679 A * | 2/2000 | Acebo .................. G06Q 10/025 705/5 |

(Continued)

FOREIGN PATENT DOCUMENTS

| EP | 3057041 A1 | 8/2016 |
| GB | 2418511 A | 3/2006 |

(Continued)

OTHER PUBLICATIONS

Denny, Applying Additional Self Service Methodologies to Commercial Aviation Baggage Handling: Is A Potential "Win-Win" Being Left on the Table?, Univ. of N. Dak. Thesis, 2010 (Year: 2010).*

(Continued)

*Primary Examiner* — Daniel Vetter
(74) *Attorney, Agent, or Firm* — Fenwick & West LLP

(57) ABSTRACT

The system includes a webserver (110) to generate a passenger journey document file (PJDF) (160) comprising a plurality of end-to-end passenger travel reservations (PTRs) for a set of passengers. The PJDF includes, for each travel leg of an end-to-end PTRs, a single-sheet integrated end-to-end travel instrument (TI) template (1000A) populated with an official boarding pass identifier (BPID) (1209) issued by one of a plurality of disparate travel host systems (JTHSs) (1501, 150$^2$, . . . , 150Y) for a respective leg. Each TI template comprising an emulated boarding pass barcode (1211) associated with the BPID for the respective leg, and for N checked-in luggage items for the respective passenger, populated with X temporary luggage tag identifiers (LTIDs) (1231A, 1233A) linked to up to X official bag tag identifiers (BTIDs) (1209) from the JTHS of the leg, wherein X and N are integers. There is a one-to-one correspondence between the LTIDs and BTIDs.

17 Claims, 26 Drawing Sheets

Related U.S. Application Data continuation of application No. 17/829,244, filed on May 31, 2022, now Pat. No. 11,687,845, which is a continuation of application No. 16/678,204, filed on Nov. 8, 2019, now Pat. No. 11,348,040.

(60) Provisional application No. 62/758,372, filed on Nov. 9, 2018.

(56) References Cited

U.S. PATENT DOCUMENTS

| | | | | |
|---|---|---|---|---|
| 6,044,353 | A * | 3/2000 | Pugliese, III | G06Q 10/02 705/13 |
| 6,910,628 | B1 * | 6/2005 | Sehr | G06Q 20/045 705/5 |
| 11,545,010 | B1 * | 1/2023 | Johnson | G06Q 10/02 |
| 2003/0189094 | A1 * | 10/2003 | Trabitz | G06Q 10/02 235/385 |
| 2004/0064415 | A1 | 4/2004 | Abdallah et al. | |
| 2004/0102979 | A1 * | 5/2004 | Robertson | G06Q 10/025 705/325 |
| 2009/0276089 | A1 * | 11/2009 | Bartholomew | G06Q 10/02 40/6 |
| 2011/0231212 | A1 * | 9/2011 | Hurley | G06Q 10/02 705/5 |
| 2013/0226632 | A1 | 8/2013 | Gibert et al. | |
| 2015/0039354 | A1 * | 2/2015 | Murphy | G06Q 10/02 705/5 |
| 2017/0068930 | A1 | 3/2017 | Attar | |
| 2018/0039679 | A1 | 2/2018 | Endres | |
| 2018/0240207 | A1 * | 8/2018 | Charrat | G06Q 10/025 |
| 2019/0139017 | A1 | 5/2019 | Malinofsky et al. | |

FOREIGN PATENT DOCUMENTS

| | | |
|---|---|---|
| WO | WO 2008/051425 A1 | 5/2008 |
| WO | WO 2018/163087 A1 | 9/2018 |

OTHER PUBLICATIONS

Alghadeir, A. et al., "Smart Airport Architecture Using Internet of Things," International Journal of Innovative Research in Computer Science & Technology (IJIRCST), vol. 4, Issue 5, Sep. 30, 2016, pp. 148-155.

Buhalis, D., "strategic and tactical use of ICTs in the airline industry," Information & Management, vol. 41, Issue 7, Sep. 1, 2004, pp. 805-825.

Gautam, P., "Online Airline Ticketing System," Centria University of Applied Sciences Thesis, Sep. 2015, pp. 1-44.

PCT International Search Report and Written Opinion, PCT Application No. PCT/US2019-060670, dated Feb. 17, 2020, 13 pages.

Wyld, D.C. et al., "Where is my suitcase? RFID and airline customer service," Marketing Intelligence & Planning; vol. 23, Issue. 4/5, Jun. 1, 2005, pp. 382-394.

United States Office Action, U.S. Appl. No. 18/214,593, Jan. 31, 2024, 14 pages.

* cited by examiner

200

```
┌─────────────────────────────────────────────────┐
│ Receiving at least one passenger journey record │
│ for check-in a passenger, each record being     │
│ associated a PAXID, a travel host system (THS)  │──── 210
│ of a plurality of THSs, journey information,    │
│ and a number N of luggage items to be           │
│ checked-in for the passenger                    │
└─────────────────────────────────────────────────┘
                        ↓
┌─────────────────────────────────────────────────┐
│ Causing, in response to a check-in request, a   │
│ travel reservation system (TRS), associated     │
│ with the THS of the passenger, to generate and  │──── 211
│ stream, to a webserver, a boarding pass         │
│ identification (BPID) for a checked-in          │
│ passenger                                       │
└─────────────────────────────────────────────────┘
                        ↓
┌─────────────────────────────────────────────────┐
│ Extracting a boarding pass identification       │──── 212
│ (BPID) for a checked-in passenger from the      │
│ stream                                          │
└─────────────────────────────────────────────────┘
                        ↓
      ( END ) ←──NO──  < N > 0? >  ──── 213
       218                ↓ YES
┌─────────────────────────────────────────────────┐
│ Causing a Departure Control Systems (DCS) of    │
│ the THS associated with the passenger, to       │
│ generate a print stream including N official    │──── 214
│ bag tag identifications (BTIDs) for the number  │
│ N of luggage items to be checked-in by the      │
│ passenger                                       │
└─────────────────────────────────────────────────┘
                        ↓
┌─────────────────────────────────────────────────┐
│ Extracting from the a print stream the N BTIDs  │──── 215
│ for the number N of luggage items for a         │
│ checked-in passenger                            │
└─────────────────────────────────────────────────┘
                        ↓
┌─────────────────────────────────────────────────┐
│ Generating N luggage tag identifications        │
│ (LTIDs) for the number N of BTID luggage items  │
│ and linking each LTID to a BTID wherein there   │──── 216
│ is a one-to-one correspondence between a LTID   │
│ and a BTID                                      │
└─────────────────────────────────────────────────┘
```

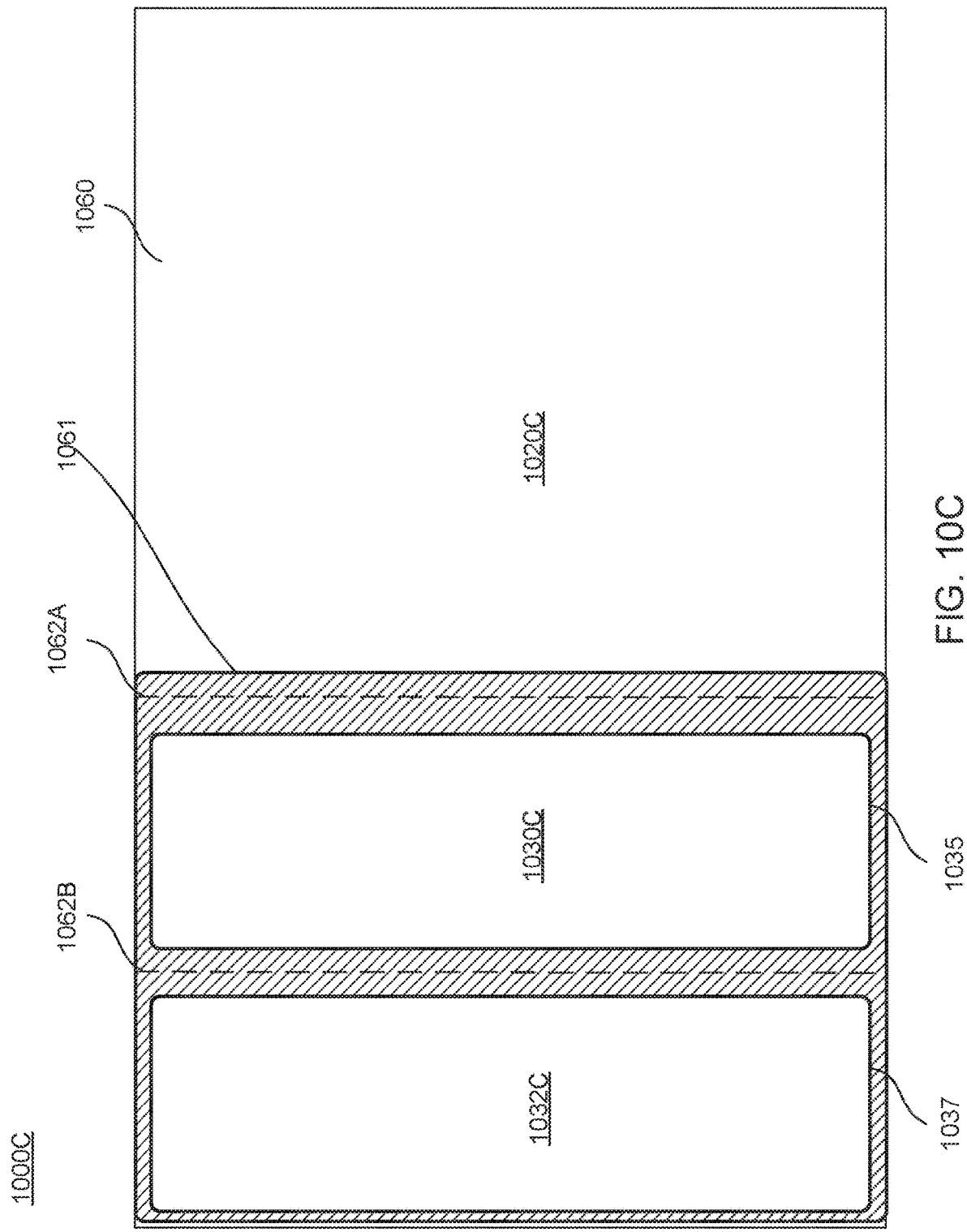

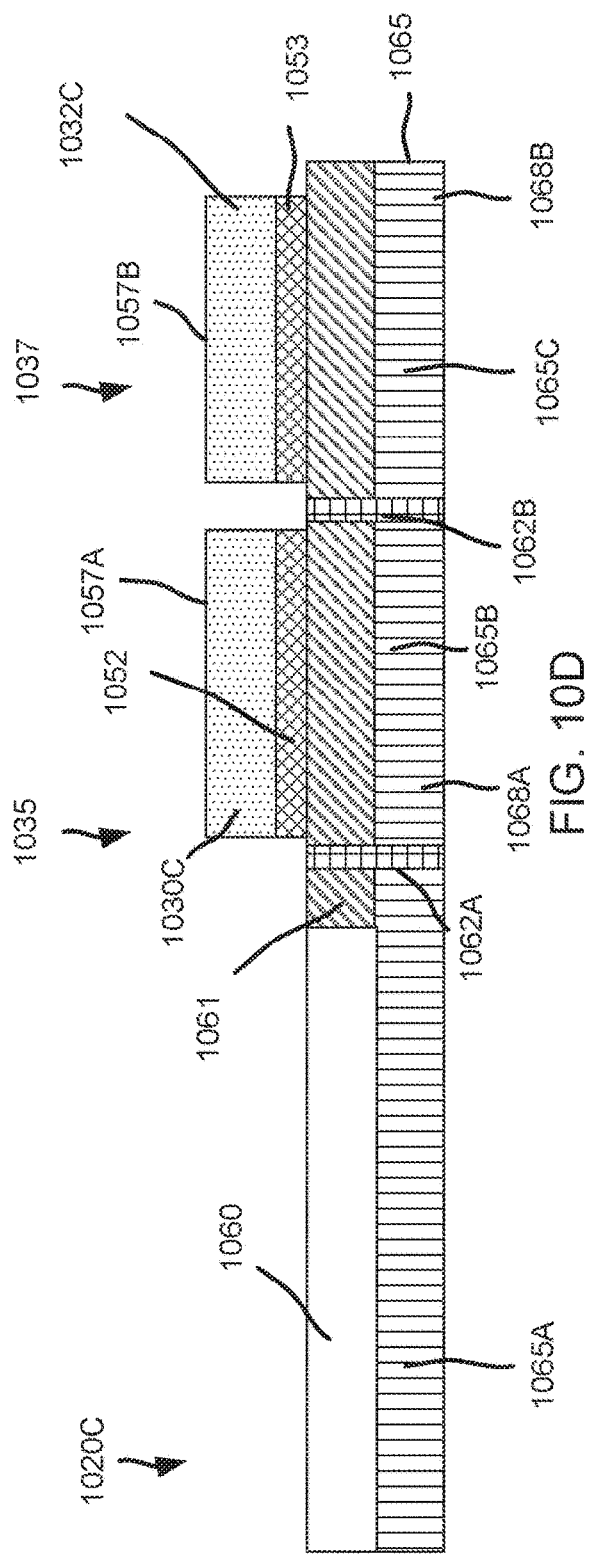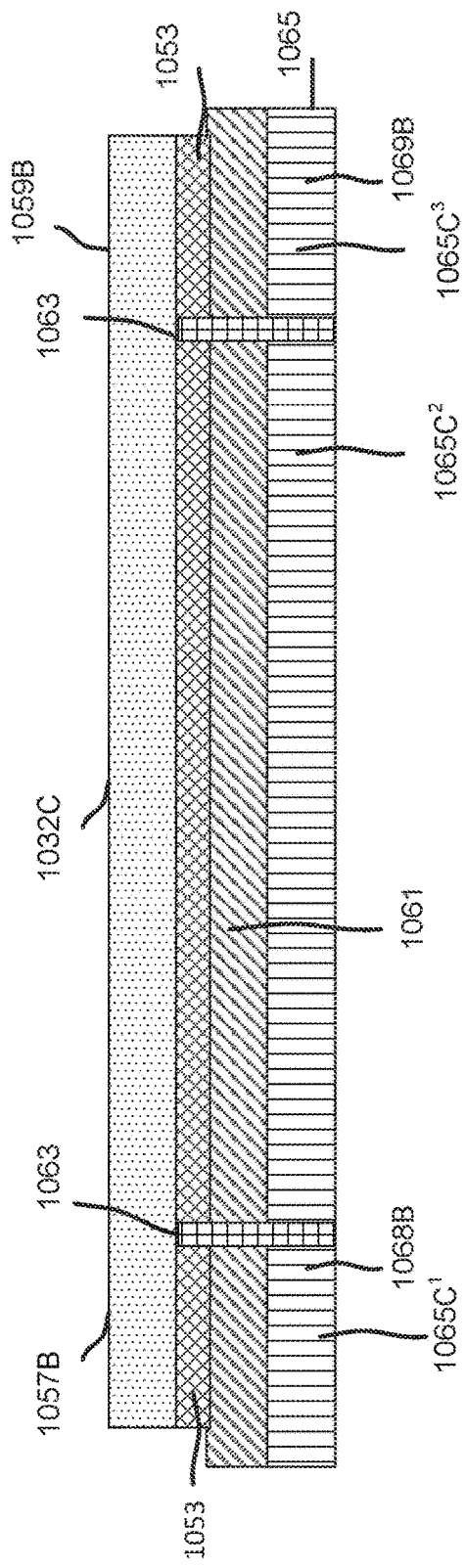

1200B

LOGO    1220B

Dear Jay Smith,
This is your boarding pass and bag tag(s) issued by ABC Airlines. Please tear off the tag(s) below and place them on your checked luggage only. Please present your boarding pass to the ABC Airlines agent to board flight 1349 from Seattle, United States of America to Dallas, United States of America.

Stateroom: A639
Luggage Claim Number(s):   0000694155   0000854156   0000694157

Sincerely,           1209              1209           1209
Cruise Ship                   1211

Please remove the below tag(s) and place them on the luggage you wish to check with the airlines
1237                                                      1231A    1229A

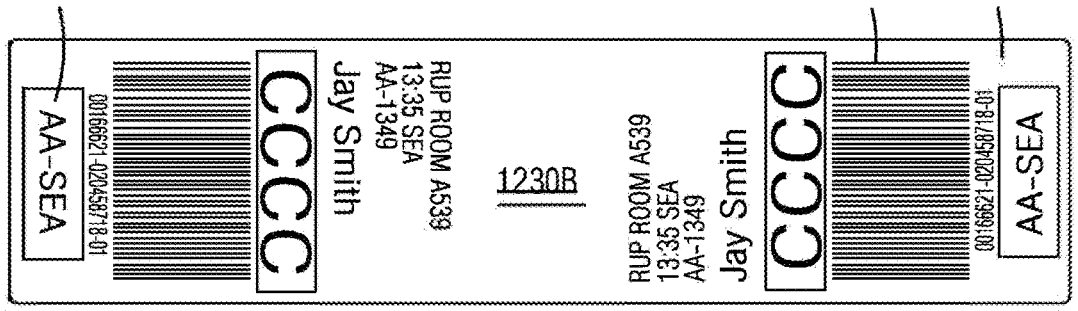

SEPARATE AND DISCARD

Dear Jay Smith,
This is your boarding pass and bag tag(s) issued by ABC Airlines. Please tear off the tag(s) below and place them on your checked luggage only. Please present your boarding pass to the ABC Airlines agent to board flight 1827 from Ft. Lauderdale, United States of America to Atlanta, United States of America.

Stateroom: 6097
Luggage Claim Number(s):    4006413733    4006438

Sincerely,

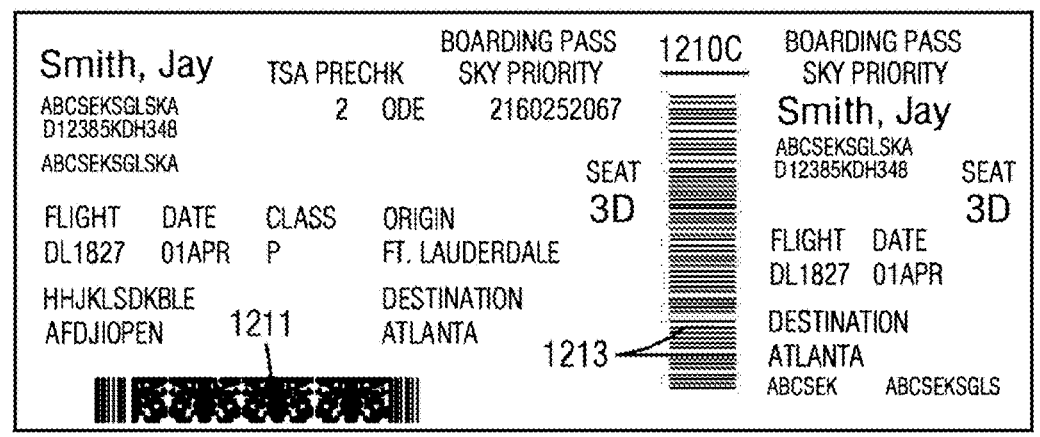

Please remove the below tag(s) and place them on the luggage you wish to check with the airlines

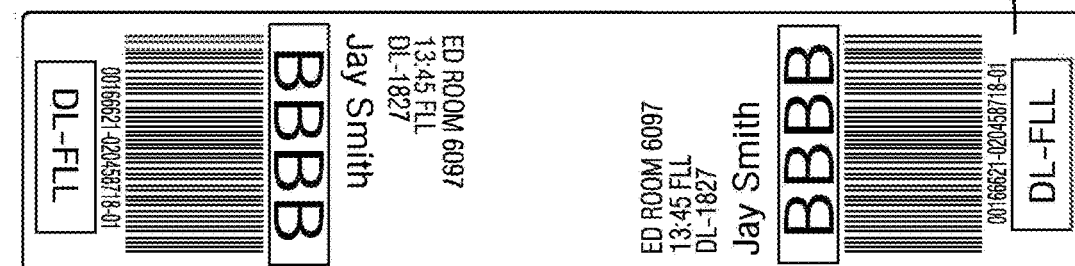

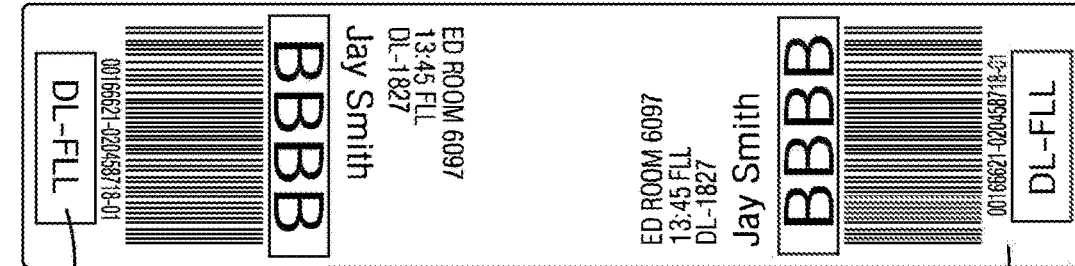

FIG. 12C

Connection Online Enrolled 2 Checked In 263 Canceled 35 Issues 10
Total 310

| Room | Last Name | First Name | Airline | Flight # | Time/Date | Journey | BP | Bag # | Tags | Status | Debark Group | Doc Ready | Printed |
|---|---|---|---|---|---|---|---|---|---|---|---|---|---|
| 7212 | Anderson | Nicole | TCA | 120 | 12:00 7/8/18 | MCO to PIT | 1 | 1 | 1 | Checked In | | NO | NO |
| 4264 | Andrews | Eugene | NW | 120 | 12:00 7/8/18 | MCO to LAX | 1 | 1 | 1 | Checked In | | NO | NO |
| 4254 | Andrews | Paulette | TCA | 120 | 12:00 7/8/18 | MCO to SCF | 1 | 1 | 1 | Checked In | | YES | NO |
| 4214 | Arthurs | George | NW | 750 | 12:05 7/8/18 | MCO to SCF | 1 | 1 | 1 | Canceled | | NO | NO |
| 4214 | Athela | Darrel | BCC | 120 | 12:15 7/8/18 | MCO to PIT | 1 | 1 | 1 | Checked In | W88 | YES | YES |
| 7245 | Athens | Tiffany | TCA | 120 | 12:15 7/8/18 | MCO to LAX | 1 | 0 | 0 | Checked In | T90 | YES | YES |
| | Atheopolis | David | BCC | 1132 | 12:28 7/8/18 | MCO to LAX | 1 | 1 | 1 | Checked In | Z66 | YES | YES |
| | Awertz | Theodore | BCC | 120 | 12:35 7/8/18 | MCO to PIT | 1 | 0 | 1 | Canceled | AAA | YES | NO |
| | Axel | Darlene | NW | 306 | 12:35 7/8/18 | MCO to SCF | 1 | 1 | 1 | Canceled | DD1 | NO | NO |
| 7362 | Azeal | Fredrick | NW | 1126 | 12:48 7/8/18 | MCO to SCF | 0 | 0 | 0 | Canceled | | NO | NO |

FIG. 14A

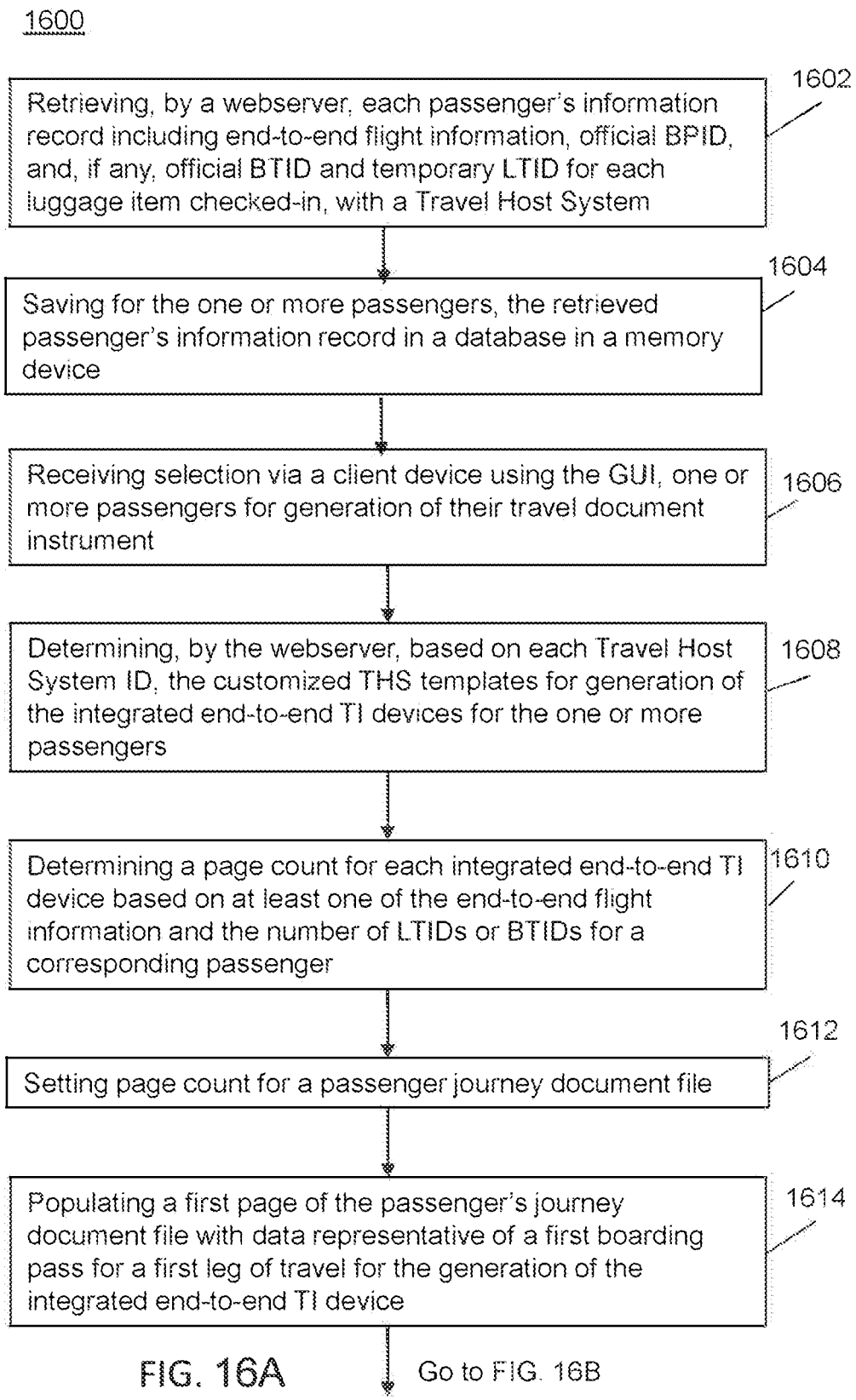
FIG. 16A    Go to FIG. 16B

INTEGRATED END-TO-END TRAVEL INSTRUMENT (TI) DEVICE GENERATION SYSTEM AND INTEGRATED TRAVEL INSTRUMENT DEVICES

CROSS-REFERENCE TO RELATED APPLICATIONS

This application is a continuation of U.S. application Ser. No. 18/214,593, filed Jun. 27, 2023, now U.S. Pat. No. 12,124,977, which application is a continuation of U.S. application Ser. No. 17/829,244, filed May 31, 2022, now U.S. Pat. No. 11,687,845, which is a continuation of U.S. application Ser. No. 16/678,204, filed Nov. 8, 2019 and claims the benefit of U.S. Provisional Application No. 62/758,372, filed Nov. 9, 2018, each titled "INTEGRATED END-TO-END TRAVEL INSTRUMENT (TI) DEVICE GENERATION SYSTEM AND INTEGRATED TRAVEL INSTRUMENT DEVICES" and incorporated herein by reference in their entireties.

BACKGROUND

Embodiments relate to travel systems and, specifically, an integrated end-to-end travel instrument device generation system and an integrated travel instrument device.

Currently, the travel industry processes well over a million passengers per day for thousands of daily flights. As a result, individuals can have long lines at the airline check-in desks to obtain boarding passes and check-in bags. To further complicate matters, many travelers arrive at the airport from cruises, hotels, conventions, etc. Baggage of passengers sometimes gets lost due to the inaccurate routing of the bags.

Thousands of passengers checking into airports at one time create an influx on ticket counters at once. Thus, ticketing kiosks have been created to allow passengers to print a boarding pass in a self-service fashion to divert some of the passenger traffic from the check-in desks. The task of printing boarding passes and luggage tags can be even more of a challenge by limited personnel available on a cruise ship.

SUMMARY

Embodiments relate to an integrated end-to-end travel instrument generation system with boarding pass and luggage tag devices on an integrated travel instrument sheet. The embodiments relate to computer readable medium for the generation of the instrument devices. An aspect of the embodiments includes a system comprising a local check-in end-to-end passenger travel reservation (PTR) tool comprising a graphical user interface (GUI) displayed on a display device. The local check-in end-to-end PTR tool configured to: upload a plurality of end-to-end PTRs, each associated with at least one of a plurality of passengers identified in a travel manifest file, display a list comprising the plurality of end-to-end PTRs and a plurality of travel reservation statuses associated with a plurality of disparate journey travel host systems (JTHSs), and receive a batch user selection of a first set of passengers of said plurality of passengers for local check-in. The system includes a webserver comprising one or more processors configured to generate a passenger journey document file (PJDF) comprising one or more of said plurality of end-to-end PTRs for each of one of said first set of passengers. The PJDF includes, for each respective travel leg of said one or more of said plurality of end-to-end PTRs, a populated single-sheet integrated end-to-end travel instrument (TI) template populated with an official boarding pass identifier (BPID) for said respective one of said first set of passengers issued by a corresponding one of said plurality of disparate JTHSs associated with said respective travel leg. Each TI template further comprising an emulated boarding pass barcode associated with the official BPID for said respective travel leg, and for N checked-in luggage items of the for said respective one of said first set of passengers, populated with X temporary luggage tag identifiers (LTID) linked to up to X retrieved official bag tag identifiers (BTIDs) issued by the JTHS of the respective travel leg, wherein X is a non-zero integer number, N is an integer number. There is a one-to-one correspondence between the LTIDs and the BTIDs. The one or more processors configured to update the travel reservation status in the GUI to reflect that the generated PJDF is ready for said respective one of the first set of passengers; and generate a master PJDF including the PJDF for each of the first set of passengers. The first set of passengers is representative of a local check-in request at a local client device for subsequent computer-assisted generation of integrated end-to-end TI devices using the generated master PJDF applied to a set of single-sheet integrated media.

An aspect of the embodiments include a non-transitory, tangible computer readable storage media having stored thereon instructions which, when executed by one or more processors, cause the one or more processors to: generate a passenger journey document file (PJDF) of an end-to-end passenger travel reservation (PTR) comprising one or more travel legs for a remotely checked-in passenger of a plurality of passengers in a travel manifest file. The PJDF includes, for each of the one or more travel legs, a populated single-sheet integrated end-to-end travel instrument (TI) template populated with an official boarding pass identifier (BPID) issued by a journey travel host system (JTHS) associated with the corresponding travel leg, an emulated boarding pass barcode associated with the official BPID for the corresponding travel leg, and for each of one or more checked-in luggage item of the respective one passenger, a temporary luggage tag identifier (LTID) linked to up to a retrieved official bag tag identifier (BTIDs) issued by the JTHS associated with the corresponding travel leg. The instructions to cause the processors to update a travel reservation status to reflect the generated PJDF is ready for the remotely checked-in passenger; receive a batch selection identifying at least one passenger of the plurality of passengers and a plurality of end-to-end passenger travel reservations (PTRs) each associated with one or more of the at least one passenger of the plurality of passengers identified by the batch selection; and generate a master PJDF including the PJDF for each of the at least one passenger of the plurality of passengers identified by the batch selection, the batch selection being representative of a local check-in request at a local client device for subsequent computer-assisted generation of one or more integrated end-to-end TI devices using the generated master PJDF applied to a set of single-sheet integrated media.

Another aspect of the embodiments includes a method comprising providing a local check-in end-to-end passenger travel reservation (PTR) tool comprising a graphical user interface (GUI) displayed on a display device. The local check-in end-to-end PTR tool configured to: upload a plurality of end-to-end PTRs, each associated with at least one of a plurality of passengers identified in a travel manifest file, display a list comprising the plurality of end-to-end PTRs and a plurality of travel reservation statuses associated with a plurality of disparate journey travel host systems (JTHSs), and receive a batch user selection of a first set of passengers of said plurality of passengers for local check-in. The method includes generating, by a webserver, a passenger journey document file (PJDF) comprising one or more of said plurality of end-to-end PTRs for each of one of said first set of passengers. The PJDF including, for each respective travel leg of said one or more of said plurality of end-to-end PTRs, a populated single-sheet integrated end-to-end travel instrument (TI) template populated with an official boarding pass identifier (BPID) for said respective one of said first set of passengers issued by a corresponding one of said plurality of disparate JTHSs associated with said respective travel leg. Each TI template further comprises an emulated boarding pass barcode associated with the official BPID for said respective travel leg, and for N checked-in luggage items of the for said respective one of said first set of passengers, populated with X temporary luggage tag identifiers (LTID) linked to up to X retrieved official bag tag identifiers (BTIDs) issued by the JTHS of the respective travel leg, wherein X is a non-zero integer number, N is an integer number. There is a one-to-one correspondence between the LTIDs and the BTIDs. The method includes updating, by the webserver, the travel reservation status in the GUI to reflect that the generated PJDF is ready for said respective one of the first set of passengers; and generating, by the webserver, a master PJDF including the PJDF for each of the first set of passengers. The first set of passengers is representative of a local check-in request at a local client device for subsequent computer-assisted generation of integrated end-to-end TI devices using the generated master PJDF applied to a set of single-sheet integrated media.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 2 illustrates a method for travel instrument data generation by at least one webserver;

FIG. 10A illustrates a front side of an integrated travel instrument template;

FIG. 10C illustrates integrated travel instrument devices on a single-sheet integrated medium;

FIG. 10D illustrates a cross-sectional view of a short side of the integrated TI device;

FIG. 10E illustrates a cross-sectional view of a short side of the integrated TI device;

FIG. 12B illustrates a second example of integrated travel instrument devices on a single-sheet integrated medium;

FIG. 12C illustrates a third example of integrated travel instrument devices on a single-sheet integrated medium;

FIG. 14A illustrates a GUI for managing local check-in, boarding pass and bag tag generation;

FIGS. 16A-16C illustrate a flowchart for generating integrated end-to-end travel instruments during a remote check-in period.

DETAILED DESCRIPTION

Figure 1A:
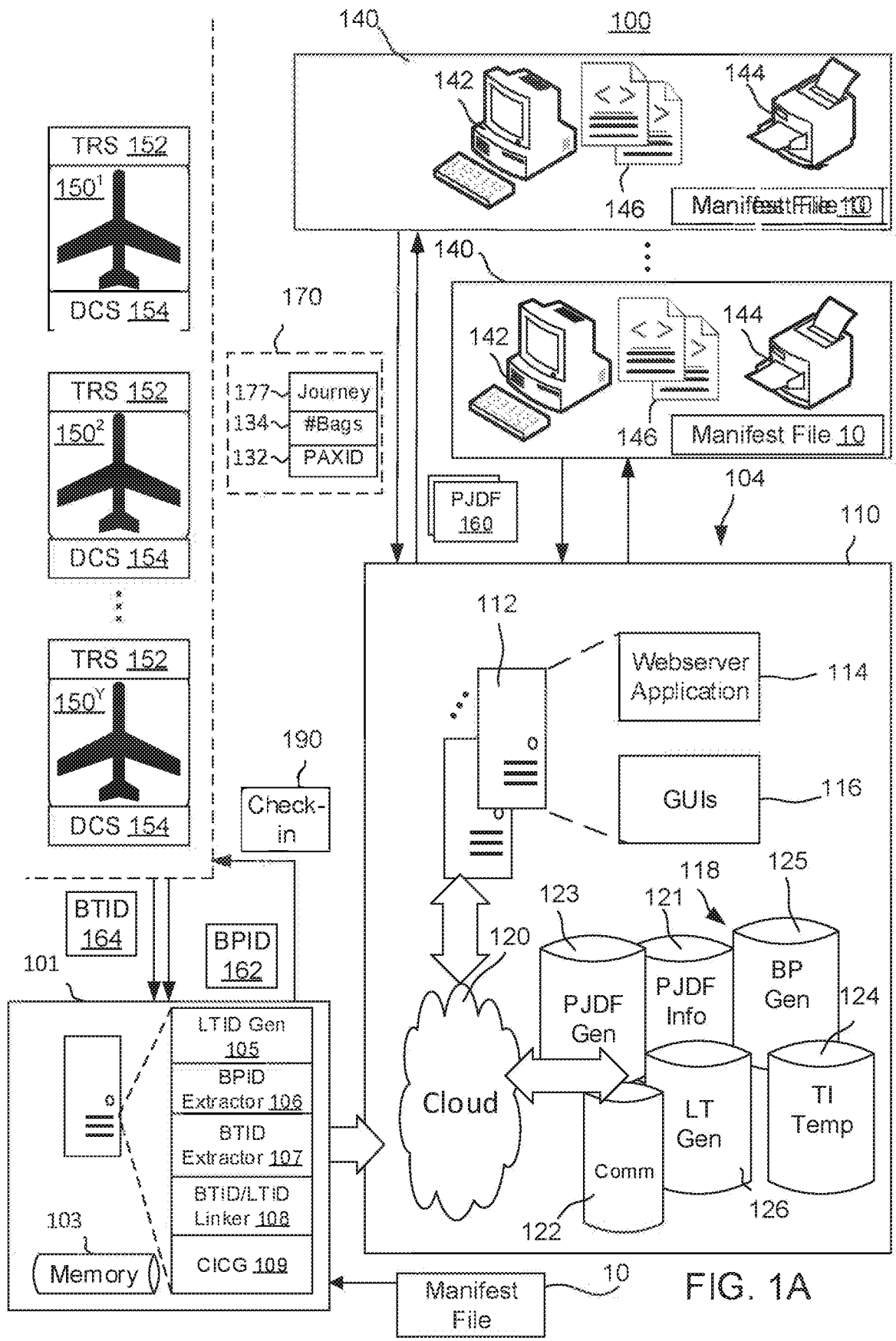
FIG. 1A illustrates a block diagram of a travel instrument generation system.

Embodiments are described herein with reference to the attached figures. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments may be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The embodiments herein include a system to generate integrated end-to-end travel instrument (TI) devices using at least one single-sheet integrated medium. The integrated end-to-end TI devices includes at least one boarding pass instrument associated with at least one leg of travel on at least one Travel Host System (THS). The integrated end-to-end TI devices may include on a single-sheet integrated medium one boarding pass instrument. If the passenger will check-in luggage items with the THS, then the single-sheet integrated TI medium may produce up to X attachable luggage tag identifier (LTID) devices wherein each attachable luggage tag device is configured to be separated from other luggage tag devices and the boarding pass instrument device so that each luggage device can be selectively attached to a respective one luggage item associated with a passenger for check-in with the THS.

A passenger may embark on multiple legs of travel such as by changing a travel vehicle at least once from a beginning or departure end to a destination end. For example, the integrated end-to-end TI devices may require a second single-sheet integrated TI medium to provide a second boarding pass instrument for a second leg of travel either using a different travel vehicle associated with the same THS or a different travel vehicle associated with a different THS. Thus, the integrated end-to-end TI device includes THS specific boarding pass instruments.

Furthermore, the integrated end-to-end TI devices may include, within or in proximity to the boarding pass instrument, at least one official bag tag identifier (BTID) associated with a THS. The at least one official BTID corresponds to at least one LTID associated with the at least one luggage tag device. In other words, if a passenger has one luggage item to be checked-in, the integrated end-to-end TI devices may include a boarding pass instrument for the THS on the first leg of travel; an official BTID printed within or in proximity to the boarding pass instrument and a luggage tag device with an LTID corresponding to and linked to the official BTID. The LTID may be used for temporary tracking of luggage items from a departure point to check-in of the luggage item with another THS. Thereafter, the THS may change the temporary luggage tag device and replace such temporary luggage tag device with an official bag tag to further track the luggage item along at least one leg of travel by the THS issuing the BTID. If the departure point is a cruise ship for example, the cruise ship is a THS wherein the passenger disembarks upon completion of the cruise for another leg of travel. For airline-type THS, a check-in period is established. For example, reservations may not be checked-in until 24 hours or less before departure on a flight.

The THS may be an airline. However, some flights from departure-end of the flight to the destination-end of the flight may include more than one aircraft vehicle. Thus, for a non-stop flight, the integrated end-to-end TI devices would include a boarding pass for a single flight. For a one-stop flight, the integrated end-to-end TI devices would include a first boarding pass instrument for the first flight and a second boarding pass instrument for the second flight. Still further, for M-stop flights, the integrated end-to-end TI devices may include up to M+1 boarding pass instrument devices. Each boarding pass instrument may be printed on a different single-sheet integrated medium to form a boarding pass instrument device for each leg of travel.

In other embodiments, a leg of travel may include a different mode of travel such as train, bus, or cruise.

FIG. 1A illustrates a block diagram of a travel instrument generation system 100. The system 100 may include at least one of a travel information extractor sub-system 101 and a travel instrument (TI) generator sub-system 104. The travel information extractor sub-system 101 may include at least one webserver 102 with a webserver application running thereon. The travel information extractor sub-system 101 may be configured to extract passenger travel information being streamed from each Travel Host System (THS) of a plurality of THSs $150^1$, $150^2$, ..., $150^Y$ wherein Y is a non-zero integer number. Each THS of the plurality of THSs $150^1$, $150^2$, ..., $150^Y$ may be an independent company such as an airline, cruise line, bus line, train line. Each THS may be a different type of travel company. For example, the plurality of THSs $150^1$, $150^2$, ..., $150^Y$ may include a plurality of airlines, a plurality of cruise lines, a plurality of train lines, and a plurality of bus lines. Furthermore, the plurality of THSs $150^1$, $150^2$, ..., $150^Y$ may include travel or transport companies providing autonomous travel services such as by self-driving vehicles. Each THS of the plurality of THSs $150^1$, $150^2$, ..., $150^Y$ may have a THS identifier (ID) or THS company ID. The travel information extractor sub-system 101 may receive a manifest file 10 from the event travel host system (ETHS). The manifest file 10 may include passenger reservations arranged in a list, wherein the passenger reservations are associated with at least one journey travel host system (JTHS). The travel information extractor sub-system 101 may initiate a remote check-in process with the JTHS (i.e., Travel Host System of the plurality of THSs $150^1$, $150^2$, ..., $150^Y$) of one or more passengers in the manifest file 10. The travel information extractor sub-system 101 may extract from the manifest file passenger information and JTHS information to initiate check-in request 190. The term THS and JTHS may be used interchangeably herein. The host check-in (HCI) system 140 may receive the same manifest file 10 associated with the ETHS. In some embodiments, the communications from the travel information extractor sub-system 101 to the travel instrument (TI) generator sub-system 104 may be one-way. In some embodiments, the communications between the travel information extractor sub-system 101 and the travel instrument (TI) generator sub-system 104 may be two-way.

The TI generator sub-system 104 may include website 110 having one or more webservers 112 with a webserver application 114 running thereon. In general, the webserver application 114 may be configured to provide one or more graphical user interfaces (GUIs) 116 sometimes referred to as webpage(s), for entering data and initiating and performing one or more processes described herein below.

The one or more webservers 112 may be coupled to one or more data storage devices 118 and cloud 120. The cloud 120 may store data, tables and databases therein. The cloud 120 may store instructions for carrying out the processes and methods described herein for generating an integrated end-to-end travel instrument (TI) device and displaying the GUIs as the user interface to the webserver and/or one or more client-side computing devices 142. The client-side computing device 142 may also be referred to as a host check-in (HCI) system 140. The one or more data storage devices 118 may store information associated travel host system (THSs) $150^1$, $150^2$, ..., $150^Y$ and store one or more integrated travel instrument (TI) templates 124 customized and formatted for each respective one Travel Host System (THS). The integrated TI templates 124 may be configured to be populated with boarding pass information associated with a THS and, if required, official bag tag identifiers. The templates 124 may include temporary luggage tag information with luggage tag barcodes and temporary luggage tag identifiers.

The travel information extractor sub-system 101 may include one or more data storage memory devices 103 which may store and track the boarding pass identifier (BPID) 162 of at least one THS of the plurality of THSs $150^1$, $150^2$, ..., $150$\ for a passenger and corresponding official bag tag identifier (BTID) 164 generated by the THS for each passenger's luggage item to be checked-in. The travel information extractor sub-system 101 may include a temporary luggage tag identifier (LTID) generator 105 configured to generate a temporary LTID. The travel information extractor sub-system 101 may include a BPID extractor 106 configure to extract a BPID communicated in a data stream from the THS of the plurality of THSs $150^1$, $150^2$, ..., $150^Y$. The travel information extractor sub-system 101 may include a BTID extractor 107 configure to extract a BTID communicated in a data stream from the THS of the plurality of THSs $150^1$, $150^2$, ..., $150^Y$. The travel information extractor sub-system 101 may include a BTID/LTID linker 108 configured to link the temporary LTID with the official bag tag identifier (BTID) 164 and stored in memory 103. The travel information extractor sub-system 101 may include a check-in communication generator (CICG) 109.

The one or more webservers 112 may comprise one or more processors (i.e., 1152 of FIG. 11) configured to receive, from a host check-in (HCI) system 140, at least one passenger identification (PAXID) 132 designated for local check-in. The HCI system 140 may use GUI 1400 (FIG. 14A) to select one or more passengers for a local reservation check-in and generate a check-in communication to the webservers 112 having at least the PAXID 132 and the number N of luggage items (#Bags) 134, if appropriate. The communication from the HCI system 140 and the webserver 112 may be compatible with an extensible markup language (XML) schema via the one or more GUis. The number N may be an alphanumeric value.

Each PAXID 132 may be associated with a passenger, a travel host system (THS) of a plurality of THSs $150^1$, $150^2$, ..., $150^Y$ and, if appropriate, a number N of luggage items (#Bags) 134 for the passenger, during an online session, as will be discussed in more detail in relation to FIG. 14A. The one or more webservers 112 may receive a number N of luggage items (bags) 134 associated with each PAXID 132, during an online session between the one or more webservers 112 and the respective one client-side computing devices 142 communicating the number N of luggage items.

Figure 1B:
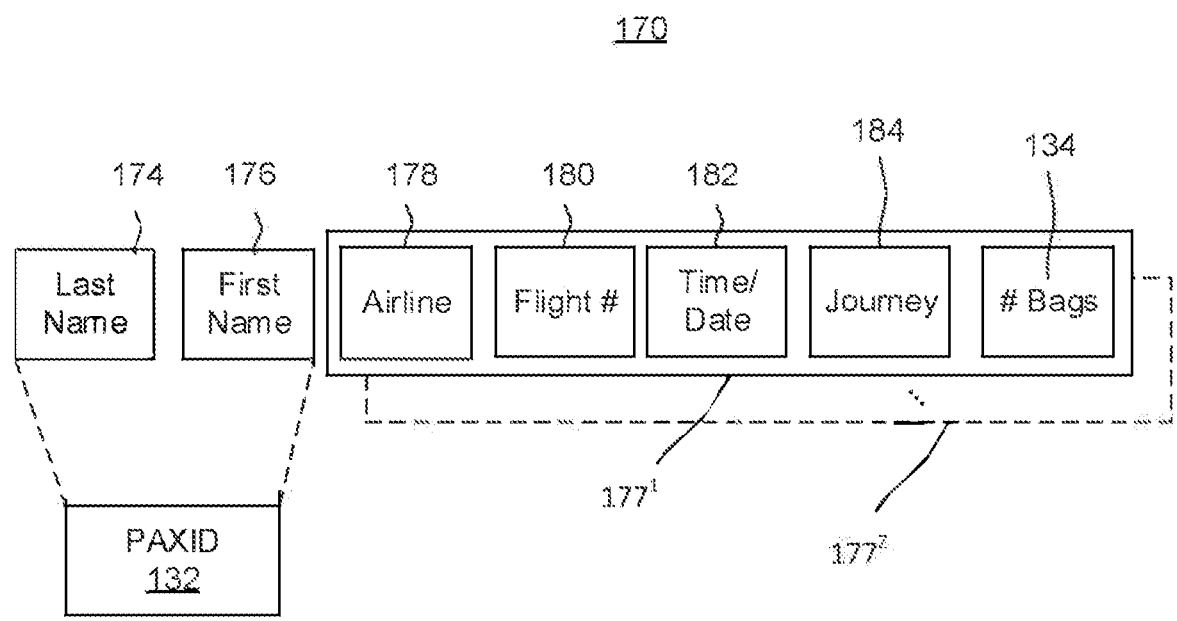
FIG. 1B illustrates a block diagram of a packet representative of a passenger journey packet.

FIG. 1B illustrates a block diagram of a passenger journey packet 170 of a selected batch including passenger information such as, without limitation a passenger identification (PAXID) 132. The packet 170 may include a field for a last name 174 and first name 176 of the passenger. The packet 170 may include at least one journey information group $177^1$. The packet 170 may include a plurality of journey information groups $177^1$ ... $177^Z$ wherein Z is a non-zero integer number. Each journey information group $177^1$ ... $177^Z$ may include a field for an airline 178 or company name or identifier of a THS of the plurality of THSs $150^1$, $150^2$, ..., $150^Y$. The journey information groups $177^1$ ... $177^Z$ of the packet 170 may include a field for a flight number 180. In lieu of a flight number 180, a train number, bus number or ship number may be used for a train-type THS, bus-type THS or ship-type THS, respectively. The journey information groups $177^1$ ... $177^Z$ of the packet 170 may include a time and date information 182 associated with the flight number 180 or, in other embodiments, the train number, bus number or ship number. The journey information groups $177^1$ ... $177^Z$ of the packet 170 may include a field representative of journey locations 184. The "journey locations" may provide information representative of a departure location to a destination location. In some embodiments, the departure location and destination location may use city codes, state codes, airport codes, train station codes, bus station codes, and cruise station codes. In general, the journey information group $177^1$ of the packet 170 may include the number # of bags 134 the passenger intends to check-in with the THS of the plurality of THSs $150^1$, $150^2$, ..., $150^Y$.

In some embodiments, the number N of luggage items may include an integer number including zero. In other embodiments, the data entry field for entering the number N of luggage items may remain blank when the number N of luggage items is zero (0). Thus, the number N of luggage items may include a value of "Null" representative of zero (0) luggage items. Thus "Null" and zero may be used interchangeably herein.

The one or more webservers 112 may be configured to cause, in response to receiving each packet 170 having the PAXID 132 the travel information extractor sub-system 101 to check-in each passenger with their respective THS. The one or more webservers 102 may communicate with the one or more webserver 112 of travel instrument (TI) generator sub-system 104.

Referring again to FIG. 1A, the webserver 102 of the travel information extractor sub-system 101 sends a remote check-in communication to the THS to receive the boarding pass identifier 162 and, if needed, the official bag tag identifier 164 of a passenger having been checked-in with the THS. The webserver 102 of the travel information extractor sub-system 101 may receive and extract passenger information from at least one stream of data originating from at least one THS. The information may be extracted by the BPID extractor 106 and the BTID extractor 107 of the webserver 102. The boarding pass identifier (BPID) 162 may include a different BPID 162 for each leg of travel. The one or more webservers 102 may be configured to receive, such as without limitation, from the Departure Control Systems (DCS) 154 of the THS of the plurality of THSs $150^1$, $150^2$, ..., 150\ associated with the passenger, a print stream including original bag tag identifiers (BTIDs) 164 for the number N of luggage items, when the number N of the luggage items is greater than zero. The number N is an integer. For example, the official BTID 164 is linked to at least one boarding pass identifier 162 for a passenger associated with the PAXID 132. The BTID/LTID linker 108 may be configured to link one set of BTIDs, LTIDs and at least one BPID together for each passenger may be saved as a passenger record in memory 103. In some instances, the passenger record will not have any BTIDs and LTIDs.

The one or more webservers 112 of the travel instrument (TI) generator sub-system 104 may be configured to generate a passenger journey document file (PJDF) 160 by retrieving the passenger record with the BPID(s), BTID(s) and LTID(s) created by the travel information extractor sub-system 101.

After retrieving the passenger record, the one or more webservers 112 may be configured to populate, for each received PAXID 132 or passenger, a first corresponding integrated travel instrument (TI) template 124, stored in one of the data storage devices 118. The TI template 124 may comprise a single-sheet integrated document format with boarding pass information corresponding to the official BPID 162 of the issuing THS to generate a boarding pass in the TI template 124 and, if required, at least one official BTID of the issuing THS. The one or more webservers 112 may populate the integrated TI template 124 with luggage tag information for at least one LTID linked to the at least one official BTID of the issuing THS. The number of LTIDs to be formed on a single-sheet of the TI template 124 corresponds to a number X of the generated LTIDs to form a first set of up to the number X temporary luggage tags in the TI template 124. The number X is an integer and corresponds to a maximum number of luggage tag sections in the TI template 124. The luggage tag designated sections will be described in more detail in relation to FIGS. 1OA-1OB.

The one or more webservers 112 may be configured to generate at least one communication to the host check-in system 140 from the webserver with the (PJDF) 160. Each communication may comprise a passenger journey document file (PJDF) 160 being associated with a respective one received PAXID 132 created based on a populated first TI template associated with the THS. The integrated end-to-end passenger journey document file may include at least one supplemental TI template for additional LTIDs for the respective one PAXID 132. On the other hand, the integrated end-to-end passenger journey document file may include a first sheet with a first boarding pass information for a first leg of travel and at least one supplemental sheet for at least one supplemental boarding pass for at least one supplemental leg of travel. In some embodiments, the integrated end-to-end passenger journey document file may be devoid of any luggage tags. In some embodiments, the integrated end-to-end passenger journey document file may include a first sheet with a first boarding pass information for a first leg of travel and at least one supplemental sheet for additional temporary luggage tags. The TI template for each boarding pass may be based on the THS associated with each different leg of travel.

The webserver 112 may be configured to populate, for each received PAXID 132, at least one supplemental integrated TI template with the luggage tag information corresponding to remaining LTIDs received to form remaining temporary luggage tags. Each supplemental integrated TI template may be populated with up to the number X of the formed luggage tags corresponding to the remaining LTIDs received. The passenger journey document file associated with the respective one received PAXID 132 may further include the at least one populated supplemental integrated TI template 124.

The number X is a function of the number of luggage tag sections for creating luggage tag devices (FIG. 1OC) associated with the integrated end-to-end travel instrument (TI) devices 1O00C. For example, if the integrated end-to-end TI devices 1O00C may include one luggage tag device. In other embodiments, the integrated end-to-end TI devices 1O00C may include two luggage tag devices, as best seen in FIG. 1OC. In still further embodiments, the integrated end-to-end TI devices 1O00C may include three or more luggage tag devices. If a passenger has more than the number of X luggage items, then when printing the TI devices 1O00C, first TI devices 1O00C are printed with the formatted luggage tag associated with the LTIDs for the first number of X luggage items and second TI devices 1O00C are printed with luggage tags associated with the LTIDs for any remaining luggage items up to a second number of X luggage items. In operation, the one or more webservers 112 determine the number of Z BPID 162 of the respective one passenger reservation for an end-to-end journey, a page count based on at least one of the number Z of BPIDs, the number N of the BTIDs/LTIDs and the number X of the maximum number of luggage tag sections in the integrated TI template 124 for producing integrated end-to-end travel instrument devices on one or more single-sheet integrated media.

In some embodiments, any luggage tag sections not required may have printed a customized statement. Likewise, if a second sheet may be needed for a second boarding pass, but X or less LTIDs are provided, then those unpopulated luggage tag sections on the second sheet may have a customized statement to indicate the tag sections may be discarded.

Still further, a second (supplemental) sheet may be used for up to X additional LTIDs without the need for a second (supplemental) sheet. Thus, the boarding pass section may have a customized statement to indicate that the unpopulated boarding pass section may be discarded. The term "unpopulated" as used herein denotes a section which does not include passenger travel identifiers such as a boarding pass identifier or luggage tag identifier mapped to a section. However, an unpopulated section may however include statements or instructions representative to convey that such sections may be blank, can be discarded, can be detached from other populated sections or unused.

The one or more webservers 112 may be configured to generate a communication to a host check-in (HCI) system 140 which includes the populated single integrated travel instrument template 124 for each page of the page count associated with each PAXID 132. In some instances, a passenger may have no luggage items. An event site may be a hotel or cruise ship for example, being sometimes referred to as an event THS. However, the end-to-end journey may still require at least one boarding pass instrument device. Thus, the boarding pass section on the single-sheet integrated medium would be populated with the boarding pass information according to the THS format with the official boarding pass identifier and emulated boarding pass barcode. The journey may include a journey THS, such as an airline, corresponding to a leg of travel from an event THS.

The received communication from the host-check-in (HCI) system 140 may send a selection of a plurality of PAXID 132 selected as a group using GUI 1400 accessed through the webserver 112, during an online session, for local check-in. Thus, the webserver 112 may be further configured to receive the group of the plurality of PAXIDs 132. Each PAXID 132 may be associated with the same THS of the plurality of THSs $150^1, 150^2, \ldots, 150^Y$. Thus, at least one travel information extractor sub-system 1O1 may monitor a data stream of each respective THS of the plurality of THSs $150^1, 150^2, \ldots, 150^Y$ in order to receive the streams of the BPID 162 and/or each official bag tag identifier (BTID) 164. The webserver 112 of travel instrument (TI) generator sub-system 104 or other processor may retrieve the stored BPID 162, passenger information and each LTID 164 of a luggage item to be checked-in for use in the generation of the integrated end-to-end travel instrument.

Accordingly, the at least one communication comprising the corresponding passenger journey document file (PJDF) 160 of each PAXID 132 in the group of the plurality of PAXIDs may be sent to the corresponding one HCI system 140.

In some embodiments, upon selection of one or more passengers via the GUI 1400 (FIG. 14A), the host check-in system 140 may communicate the passenger journey packet 170 to the website 110 wherein the packet 170 may be based on the passenger travel record for each selected passenger. In some embodiments, upon selection of one or more passengers via the GUI 1400 (FIG. 14A), the passenger journey packet 170 may be generated by the website 110 so that webserver 102 may communicate with the journey THS to check-in the selected passenger(s). In some embodiments, the website 110 may receive remote check-in passenger information via an application programming interface (API) from the travel information extractor sub-system 101. Furthermore, in some embodiments, the received remote check-in passenger information may be stored until the local check-in request is received from the host check-in system 140. Therefore, the GUI 1400 may be updated to reflect the status of the PJDF 160 is on the display device when the PJDF file status changes.

The travel information extractor sub-system 101 may be configured to extract from the stream the BPID 162 from the THS of the plurality of THSs 1501¹, 150², . . . , 150ʸ. The travel information extractor sub-system 101 may be configured to extract travel departure and arrival information related to the event sites. The webserver 112 of the travel instrument (TI) generator sub-system 104 may be configured to look-up a stored unpopulated integrated TI template 124 associated with the THS of the plurality of THSs 150¹, 150², . . . , 150ʸ in a template database, based on the THS identifier. In some embodiments, the integrated TI template 124 may be a default template. If different Travel Host Systems of the plurality of THSs 150¹, 150², . . . , 150ʸ are required for the end-to-end journey, then the integrated TI template for each different THS may be looked up and populated in a different single-sheet integrated medium such that there may be a one-to-one correspondence between a single-sheet integrated medium and a boarding pass instrument. The travel instrument (TI) generator sub-system 140 may include a communications database 122 having instructions or program code for establishing communications with the travel information extractor sub-system 101 and the transfer of data therebetween.

When, the integrated TI template 124 is populated with the boarding pass information related to the received BPID and up to the number X luggage tags associated with the received LTIDs on a first side of a single page. Hence, the webserver 112 may be configured to retrieve custom border information and identify a designating area of a second side of the integrated TI template 124 for populating the customer border information. The webserver may be configured to populate the second side of the integrated TI template 124 with the custom border information in the designated area of the second side. The webserver may be configured to autonomously create a portable document format (PDF) or other image-based text format file from the populated integrated TI template 124 wherein the formed boarding pass comprises a barcode readable by the corresponding THS of the plurality of THSs 150¹, 150², . . . , 150ʸ and being associated and/or linked with the BPID 162.

The system 100, after receiving data streams from THS of the plurality of THSs 150¹, 150², . . . , 150ʸ, may generate or build a standard barcode boarding pass (BCBP) to support the PECTAB specifications. (PECTAB refers to a parametric table). The passengers will be able to provide the barcode boarding pass printed on the integrated end-to-end TI devices 1O00C (FIG. 1OC) at the point of departure (POD), for subsequent scanning when boarding the vehicle of transportation, such as an airplane, bus, train or cruise ship. While the description herein for illustrative purposes the THS of the plurality of THSs 150¹, 150², . . . , 150ʸ is related to airline systems, barcode boarding passes (BCBP) are also used in other modes of travel (bus, train, and cruise ship) for which a passenger may have luggage to be checked-in and tracked during travel to a destination.

All airlines have a set procedure for the timing of certain events for checking in of passengers or by passengers in advance of flight departure. The airline procedures may include restrictions on when the earliest time for check-in may be, when security checks must be performed, when a bag tag can be printed, latest check-in, etc. By collecting reservation information one day or more in advance of a passenger's departure date, the system 100 will emulate one or more of the airline procedures or THS procedures in a remote environment. The system 100 may be configured to automatically perform automatic check-in, luggage tag deletion/reconciliation, security verification, boarding pass "printing," and luggage tag identifier "printing." Additionally, other transportation companies have timing procedures for check-in or pre-check.

The system 100 may include a plurality of blank integrated end-to-end travel instrument (TI) devices 146 for use by the HCI system 140. Each blank integrated end-to-end TI device 146 may be configured to have printed thereon a corresponding one leg of travel associated with a THS. The blank integrated end-to-end TI device 146 may include a boarding pass designated section for populating the official BPID 162 of the respective one passenger associated with the PAXID and building an emulated boarding pass within the section as defined in the integrated TI template 124 according to a customized THS emulated format. The customized THS format may include THS derived emulating parameters for the creation of an emulated boarding pass through the creation of a boarding pass instrument. The boarding pass instrument includes an emulated bar code recognizable by the THS issuing the official BPID 162.

In system 100, the client-side HCI system 140 may comprise a computing device 142 coupled to a printer device 144 or peripheral device via wireless or wired connection. The computing device 142 is described below in relation to FIG. 11. The printer device 144 may be a laser-jet printer or other printer types. The client-side HCI system 140 receives the populated integrated TI template formatted into a passenger journey document file (PJDF) 160. The passenger journey document file (PJDF) 160 may be printed on at least one integrated TI device 146 configured to pass through the printer device 144 to print alphanumeric data, logos, barcodes, images, and/or symbols thereon. Each leg of travel for the end-to-end journey may require a different official BPID. Therefore, each different BPID instrument requires its own integrated TI device 146 for printing an official BPID and corresponding emulated bar code recognizable by the issuing THS.

A passenger may be part of a travel group such as a couple, family, etc. which share a single travel reservation. The system 100 may be designed to expedite document generation for the barcode boarding pass and luggage tag identifier.

The website 110 may store the PJDF information 121 corresponding to the passenger journey document file (PJDF) and/or passenger record associated with the PAXID 132 in a data storage device. The PAX information 121 may also include the number N of luggage items. The PAX information 121 may also include the received official BPIDs 162 and received LTID. Some passengers (PAX) may have multiple official BPIDs to complete the end-to-end Journey.

The website 110 may store a plurality of integrated TI templates 124 in a data storage device. Each integrated TI template 124 may be associated with different templates associated with a company's (THS) record. The website 110 may store a default integrated TI template. The website 110 may include instructions stored in a data storage device corresponding to a boarding pass (BP) instrument generator 125. The website 110 may include instructions stored in a data storage device corresponding to a temporary luggage tag (LT) generator 126. The website 110 may include instructions stored in a data storage device corresponding to a passenger journey document file (PJDF) generator 123. For example, the webserver 112 may send one or more PJDFs 160, for one or more passengers, to a respective one HCI system 140 based on a batch selection from the respective one HCI system. For example, if an operator using GUI 1400 wants to print one passenger journey document file, the operator would select a corresponding passenger row which can then be printed, provided the passenger journey document file is indicated as available.

The travel information extractor sub-system 101 may include instructions stored in a data storage device to monitor, extract and/or receive a passenger's journey information (i.e., official BPID and official BTID) associated with the PAXID. The passenger's journey information may include at least one official BPID. The passenger's journey information may include no bag tag identifiers. In other instances, the passenger's journey information may also include at least one official bag tag identifier (BTID), if generated by the travel information extractor sub-system 101.

The extracted official BPIDs for all passengers may be stored in memory 103 and/or in the database with the PAX information 121 at webserver 112. The travel information extractor sub-system 101 may be configured to generate a temporary luggage tag identifier (LTID) for each official BTID and stored in memory 103, such that there is a one-to-one correspondence between a temporary LTID and an official BTID of an issuing THS. The travel information extractor sub-system 101 links the temporary LTID and the official BTID together wherein the boarding pass (BP) instrument generator 125 may also populate the official BTID. Hence, the integrated end-to-end travel instrument (TI) device for a one leg of travel will include an official BPID, emulated boarding pass barcode, and up to X LTIDs having a one-to-one correspondence with up to X official BTIDs. The official BTIDs may be applied to or near the boarding pass designation section of the integrated end-to-end travel instrument (TI) device. The temporary LTIDs may be individually applied to a designated one LTID designated section.

The travel instrument (TI) generator sub-system 104 retrieves the passengers journey information including the passenger information, the official BPID of an issuing THS and, if required, the one or more official bag tag identifiers (BTID) of the issuing THS. The term "required" is intended to define the instance where the passenger includes a luggage item that is required to be checked-in by the THS such as, without limitation, based on size, or will be checked-in by the passenger. Therefore, in either instance, the THS may require an official BTID to track the checked-in luggage item during the passenger's journey.

System 100 may allow the client-side computing device 142 to cause a printer 144 or peripheral device to mass print a boarding pass and/or luggage tags in a created PDF file or other image-based text format file containing all of the selected passengers' documents in one print request. This may eliminate the need to sort and match travel documentation for a passenger. Matching the boarding pass with a separate luggage tag is no longer required because both may be generated on a single-sheet integrated medium. Eliminating the sorting and matching tasks from thousands of passengers daily saves considerable time not to mention minimizing human errors, by way of non-limiting example, caused by mismatched boarding pass and luggage tags.

System 100 expedites the document generation required during travel mode check-in. Rather than printing a boarding pass and luggage tag for each and every passenger disjointedly, the system 100 generates a master page document format (PDF) file or other image-based text format file containing all of the selected passengers' documents or pages into a single file for all selected passengers. The master PDF file generated by the system 100 facilitates a bulk print or generation of these passenger documents/pages, which saves hours of labor. The passenger document file may comprise a single file with NIX rounded to the next sequential integer including both a boarding pass and up to the number X luggage tags, for a single boarding pass. The system 100 also determines a boarding pass count, as described in relation to block 714 of FIG. 7A. The passenger document file may also include a single file which includes at least one additional page with additional luggage tags or additional BPs when the number N is greater than the number X. The number N corresponds to the number of luggage items to be checked-in. The number X is the maximum number of luggage tag sections on a single sheet for printing the generated luggage tags.

The inventors have determined that the creation of an integrated travel instrument rescues agents or personnel from the time-consuming practice of manually matching luggage tag identifiers and boarding passes printed individually for delivery to the customer for their eminent travel. This, in turn, may minimize the chance of a passenger getting an incorrect document or travel instruments.

The system's ability to perform bulk printing with a combination of boarding pass and luggage tag identifiers on an integrated TI device 146 significantly decreases the labor cost of running check-in operations, while also allowing larger passenger volumes to be handled with less error. Also, the use of laser-jet printers 144 to print the end-to-end travel instruments may save thousands of dollars in the cost for special-purpose AEA printers. (AEA stands for the Association of Europe Airlines). The printer 144 can be used for printing other documents or files other than boarding passes and luggage tags, unlike the special-purpose AEA printer.

The HCI system 140 will be provided with access to website 110 so that they may mass print boarding documents for passengers enrolled in a remote airline check-in program. Customers will receive their boarding pass instrument device and luggage tag devices on the integrated (TI) devices comprising in-part paper stock (i.e., single-sheet integrated medium). The webserver 112 generates a boarding pass for each passenger that complies with AEA standards for printing by the HCI system 140.

The official boarding pass identifier (BPID) 162 may be formed as an AEA compliant print stream format. The data of the print stream received from the THS of the plurality of THSs $150^1$, $150^2$, ..., $150^Y$ may be used in an integrated TI template 124 to build a boarding pass which is AEA compliant using the official BPID 162 with an emulated boarding pass barcode and, if required, build at least one luggage tag, as shown in relation to FIGS. 12A-12C.

As can be appreciated, one or more of the blocks of the processes or methods described below may be performed in order shown or in a different order. One or more of the blocks may be omitted or blocks may be added. Furthermore, one or more of the blocks may be performed contemporaneously. One or more of the blocks in FIG. 2 may be performed by at least one of the travel information extractor sub-system 101, the travel instrument (TI) generator sub-system 104, BTID/LTID linker 108 and CICG 109. In some embodiments, one or more of the functions of the travel information extractor sub-system 101, the travel instrument (TI) generator sub-system 104, BTID/LTID linker 108 and CICG 109 may be performed by the other sub-system. In some embodiments, the travel information extractor sub-system 101 and the travel instrument (TI) generator sub-system 104 may be an integrated system.

FIG. 2 illustrates a method 200 for travel instrument data generation by at least one webserver for a passenger. The method 200 of FIG. 2 is repeated for each passenger requiring check-in for a journey using one of the travel modes described herein. The method may comprise, at block 210, receiving at least one passenger journey record for a passenger designated for check-in, each passenger journey record being associated with a passenger, PAXID 132, a journey or flight information, a travel host system (THS) of a plurality of THSs $150^1, 150^2, \ldots, 150^Y$ and a number N of luggage/bag items 134 to be checked-in for the passenger, by at least one webserver 102 or 112. The at least one passenger journey record may be from a manifest file 10. In some embodiments, the host check-in system 140 may communicate to the website 110 to initiate a local check-in of one or more passengers from an uploaded travel manifest file 10. In other embodiments, the website 110 may generate an automatic check-in of passengers based on a prior stored travel manifest file 10. In other embodiments, the webserver 102 of the travel information extractor sub-system 101 may generate a remote check-in of passengers initiated by the website 110 based on a prior stored travel manifest file 10. In still further embodiments, the host check-in system 140 may communicate directly with the travel information extractor sub-system 101 to initiate a remote check-in request of the passengers using the travel information extractor sub-system 101. The CICG 109 may be configured to perform check-in process communications by establishing a check-in or pre-check with the THS associated with a passenger. In response to the check-in communication, the streamed BPID and/or BTIDs may be extracted from the return check-in communication from the THS. In some embodiments, the travel information extractor sub-system 101 may receive the manifest file 10 from the event THS within a certain amount of time before passengers depart the location of the event THS, such as 24 hours before a flight leaves or other increment of time, such as the night before departure of the event THS. The travel information extractor sub-system 101 may then initiate a remote check-in request with each JTHS of those passengers in the manifest file having a reservation with the JTHS.

The method 200 may comprise, at block 211, causing, in response to a check-in request, a Travel Reservation System (TRS) 152, a Departure Control Systems (DCS) 154 or other designated system, associated with the THS of the passenger, to generate and stream, to the webserver 102 or 112, an official boarding pass identifier (BPID) 162 for a checked-in passenger. The CICG 109 may generate a check-in request to a corresponding THS associated with a corresponding passenger record. Because, each passenger may be associated with a different THS, the CICG 109 may generate a plurality of communications to each THS, for example, associated with a batch of selected passengers. At block 212, the method 200 may comprise extracting each BPID, by the BPID extractor 106, for a checked-in passenger.

At block 213, the method 200 may determine if N is greater than zero. As can be appreciated based on the description herein the condition of N may include other criteria, such as Ni-(not equal to zero). If the determination is "YES," then the method 200 may comprise, at block 214, causing the Departure Control system (DCS) 154 to generate a print stream of N official BTIDs 164 for N number of luggage items to be checked-in by the passenger. At block 215, extracting, by the travel information extractor sub-system 101, the N official BTIDs 164 from the Departure Control Systems (DCS) 154 of the issuing THS of the plurality of THSs $150^1, 150^2, \ldots, 150^Y$. At block 216, the method 200 may comprise generating N LTIDs and linking each LTID to a BTID, wherein there is a one to one correspondence with each BTID and linked LTID.

The TRS 152, DCS 154 or other designate system of the THS may provide the official BPID 162 upon check-in of the passenger within a certain time period prior to departure, sometimes referred to as the check-in period which may be up to 24 hours prior to departure. Other time periods may be provided based on the airline and the travel priority status of the passenger. The DCS 154 may provide the official BTID 164 for each luggage items to be checked for the passenger. Nonetheless, the official BPID and BTID may be provided by a THS or some department associated therein and should not be limited to a TRS 152 and/or the DCS 154. If the journey includes more than one stop with a different THS, a boarding pass identifier may be generated by a different THS wherein checking in the passenger may include communicating with all THS's for a passenger to obtain all the necessary boarding pass identifiers for the end-to-end travel journey.

The temporary luggage tag identifiers (LTID) for the number N of luggage items, when the number N of the luggage items is greater than zero, are generated and linked to the BTIDs. The number N may be an integer. The PAX information streamed by each THS may be stored in the database in memory 103 at the travel information extractor sub-system 101. The retrieved information may be used to populate the integrated travel instrument (TI) template sheet by the travel instrument (TI) generator sub-system 104.

Returning again to block 213, if the determination is "NO," meaning that N is not greater than 0, then at block 218, the method 200 ends. If N is O then the passenger has no bags to check-in and no luggage tags may be needed. Thus, the luggage tag designated sections may have printed using a message to indicate that the blank luggage tag devices may be detached from the boarding pass instrument. In some instances, the message may indicate that the blank luggage tag device may also be discarded. Other messages may be used to convey instructions to the passenger or other persons to otherwise disregard the blank luggage tag devices.

Figure 12A:
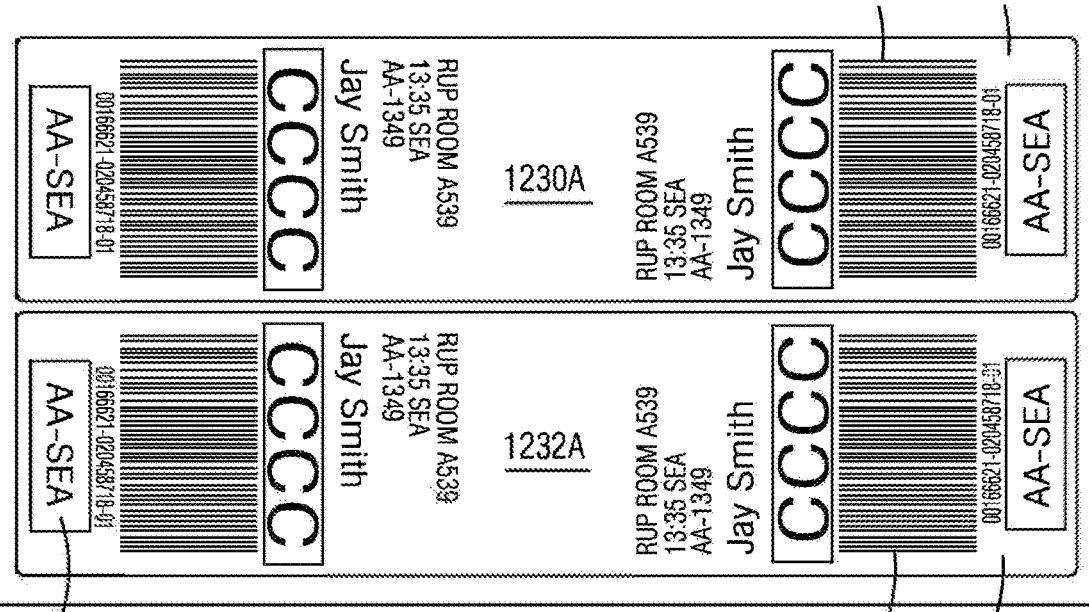
FIG. 12A illustrates a first example of integrated travel instrument devices on a single-sheet integrated medium.

Any unpopulated sections, such as the boarding pass designated section or the luggage tag designated section will be blank or printed with a message, as shown in FIGS. 12A-12C.

A more detailed process for populating the integrated travel instrument template is described in detail below in relations to FIGS. 3-6, 7A-7B, 8 and 9 wherein X is equal to 2.

Figure 3:
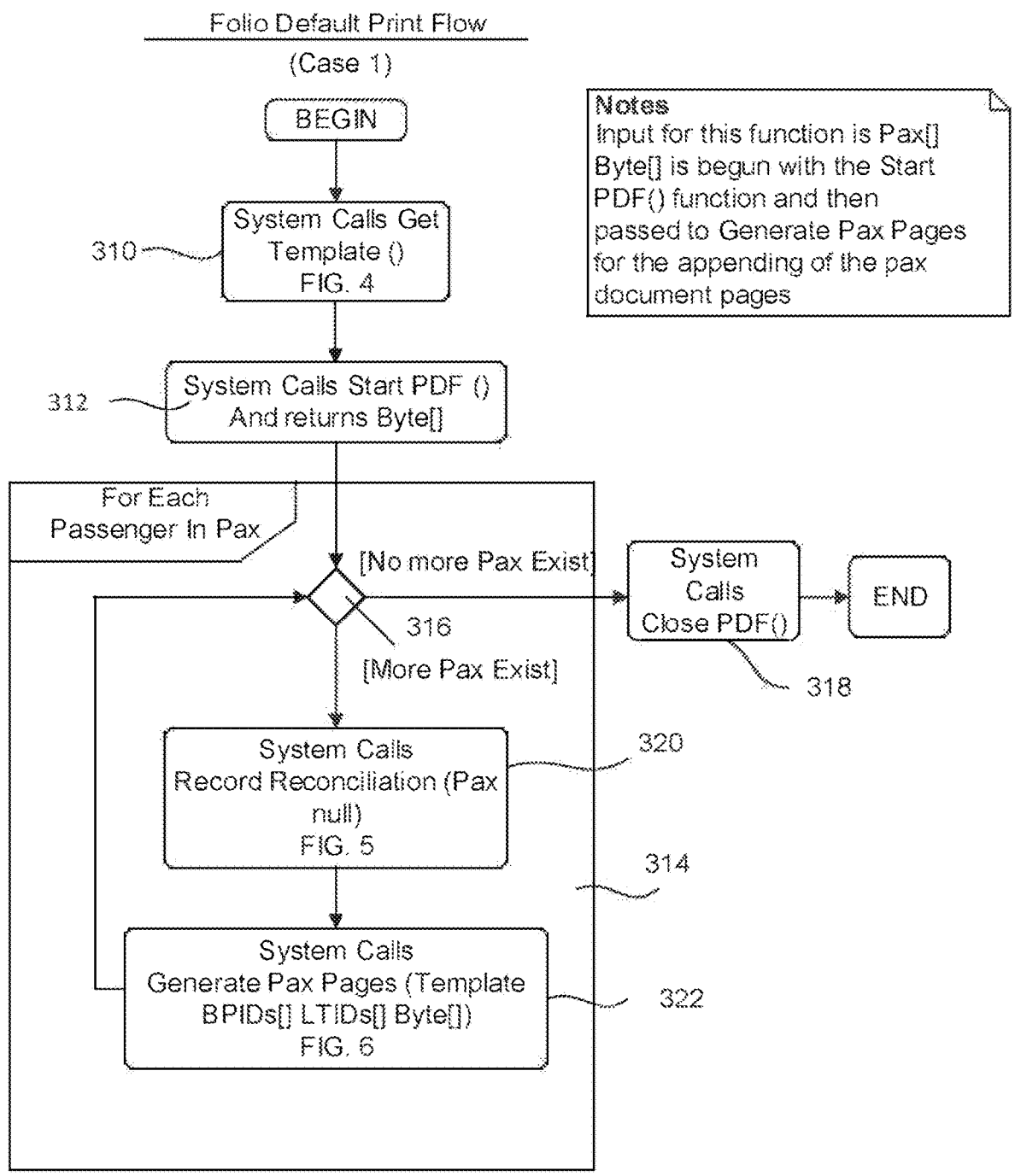
FIG. 3 illustrates flowchart for a process for creating a passenger document file for one or more passengers (PAX)

FIG. 3 illustrates flowchart for a process 300 for creating a passenger document file for one or more passengers (PAX). When the process 300 begins, the process 300 retrieves/calls the stored integrated template (FIG. 10A), at block 310. The process for retrieving or calling the stored integrated template will be described in relation to FIG. 4.

At block 312, the system starts a PDF or other image-based text format file generation for at least one passenger journey document file 160. At block 314, there is a loop process described below. At block 316, a determination is made. If no more passengers (PAX) exists, the system closes the PDF or other image-based text format file, at block 318 and ends the process 300. (The term "PAX" refers to a passenger.) If there are more passengers, the system performs reconciliation on the record using the process of FIG. 5, at block 320. At block 322, the process generates the boarding pass with the official boarding pass identifier (BPID), the emulated boarding pass barcode of the THS and official bag tag identifier (BTID). The process may also generate a temporary luggage tag identifier (LTID) using the process of FIG. 6. Block 322 loops back to block 316 where a determination is made as described above. This is repeated for each selected passenger selected in a batch using GUI 1400 (FIG. 14A) such as on a cruise intending to leave the ship. The terms "passenger" and "PAX" may be used interchangeably herein.

Figure 4:
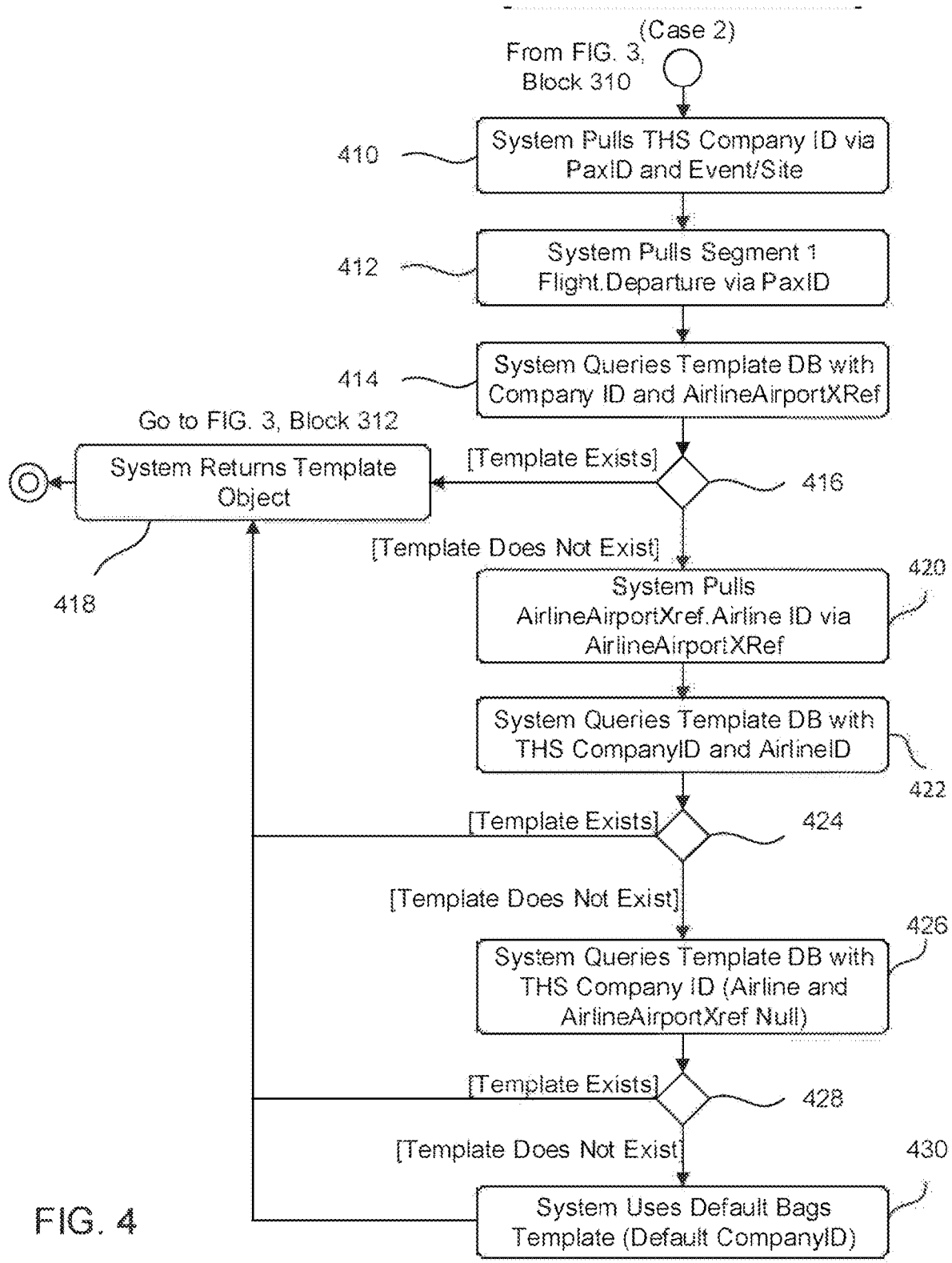
FIG. 4 illustrates a flowchart of a method for retrieving or calling a stored integrated travel instrument (TI) template.

FIG. 4 illustrates a flowchart of a method 400 for retrieving or calling a stored integrated travel instrument (TI) template. The method 400 from block 418 may return to process 300 of FIG. 3, described above and proceed to block 312. The method 400 may, at block 410, pull the THS (company) identifier (i.e., airline) via the PAXID and other data, as appropriate. At block 412, the method 400 may pull segment 1 which may be the flight departure information via the PAXID. At block 414, the method 400 queries the template database with THS company ID and airline airport reference (AirlineAirportRef), when the THS is associated with an airline. The different THSs of the plurality of THSs $150^1$, $150^2$, . . . , $150^Y$ may be associated with a travel company. Each THS of the plurality of THSs $150^1$, $150^2$, . . . , $150^Y$ may specify their own customized boarding pass template and luggage tag template. The boarding pass template may determine a location for placement of the emulated boarding pass barcode and other required information. Specifically, the template may include verbiage in a header paragraph and other verbiage to be printed on the integrated end-to-end TI device. The boarding pass formats may be dictated by the airline PECTAB.

At block 416, the method 400 may determine if a template exists for the THS ID. If a template associated with the THS ID exists, block 416 proceeds to block 418 where the method 400 returns the template object for the THS ID. Block 418 proceeds to block 312 of FIG. 3. In some embodiments, the boarding pass designated section may include a designated area for a supplemental THS message. For example, the journey may begin at a cruise line. A cruise line statement may be placed above the boarding pass for a THS of a next leg of travel.

If at block 416 it is determined that no template exists for the THS ID, the method 400 pulls a THS company ID via an airline airport reference, for example, at block 420. At block 422, the method 400 may query the template database with the company ID and/or airline ID.

At block 424, a determination is made whether a template exists. If a template exists after block 424, the method 400 proceeds to block 418. If at block 424 a template does not exist, then at block 426, the method 400 may query template database with company ID and airline and airline airport reference set to null. At block 428 a determination is made whether a template exists. If a template exists after block 428, the method 400 proceeds to block 418. If at block 428 a template does not exist, then at block 430, the method 400 uses a stored default integrated TI template. Block 430 then proceeds to block 418.

Figure 5:
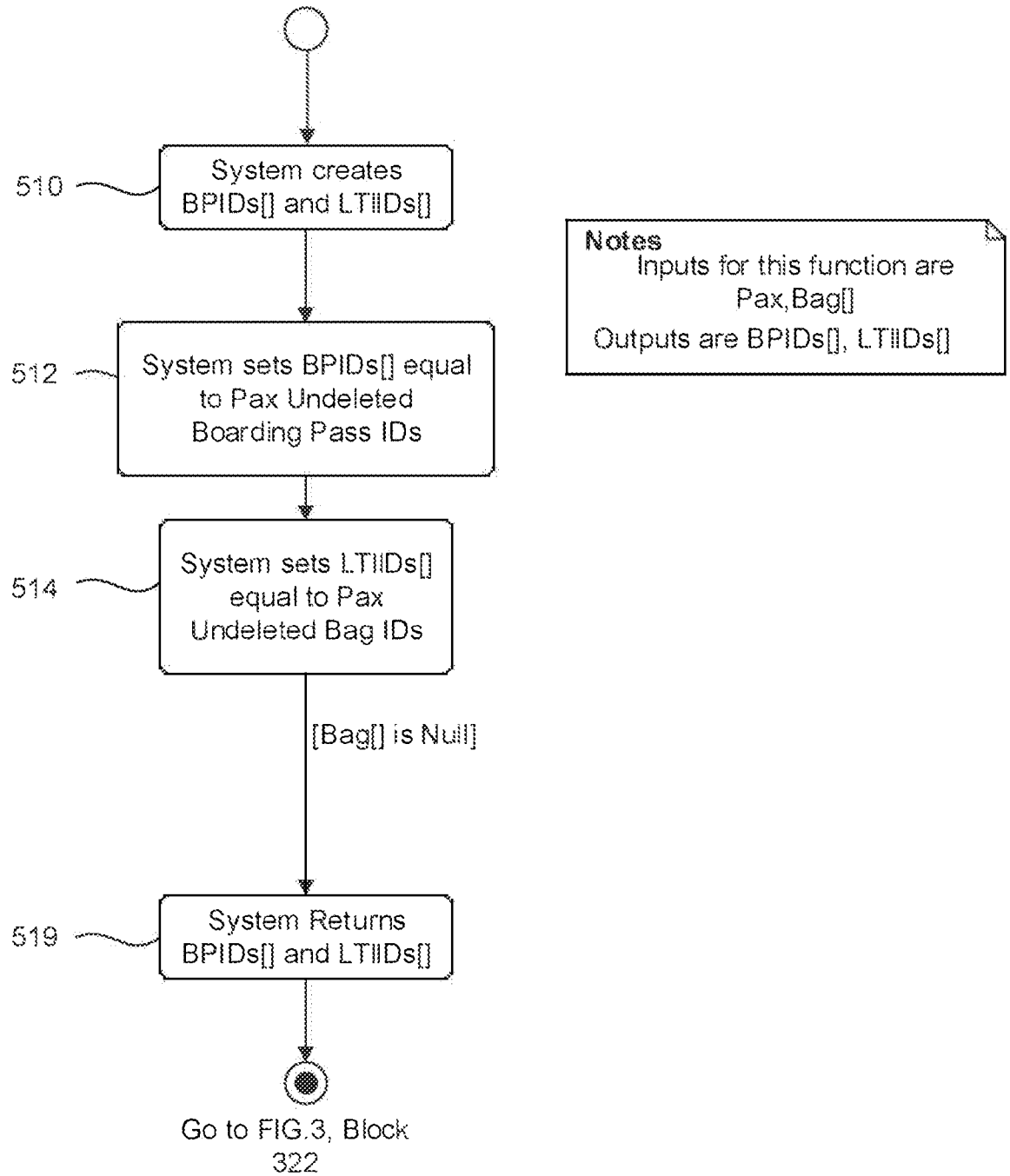
FIG. 5 illustrates a process for reconciliation of a passenger (PAX) record.

FIG. 5 illustrates a process 500 for reconciliation of a passenger (PAX) record performed in block 320 of FIG. 3. At block 510, the process 500 creates a boarding pass and luggage tag such as by a programmatic array. At block 512, the system sets BPID equal to PAX undeleted boarding pass ID. At block 514, the system sets LTID equal to PAX undeleted bag IDs. Then, at block 519, the system 100 returns the BPID[ ] and the LTID[ ] to block 322 of FIG. 3.

Figure 6:
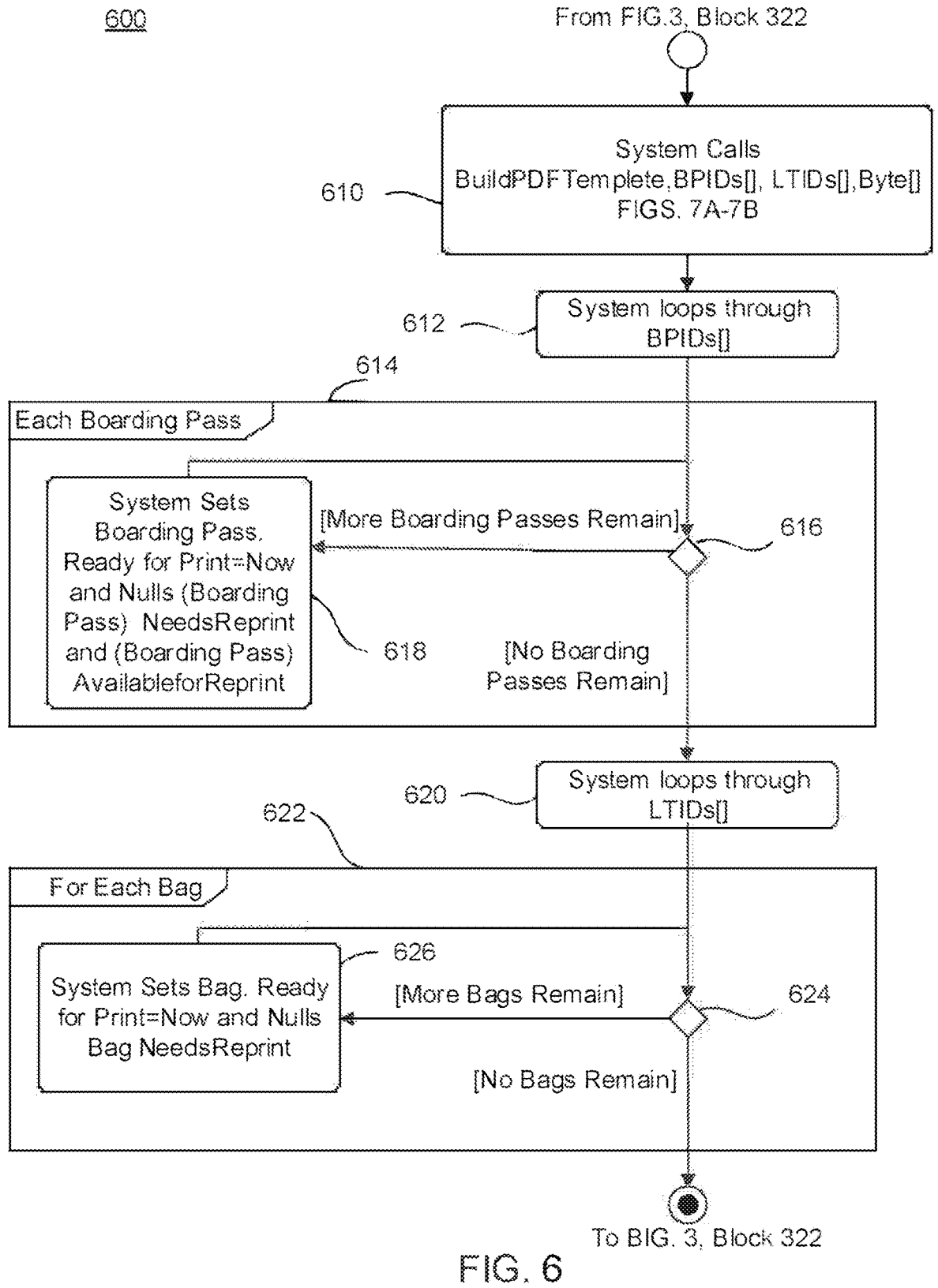
FIG. 6 illustrates a process for associating the boarding pass with one or more luggage tags in the passenger document file for a passenger (PAX)

FIG. 6 illustrates a process 600 for associating the boarding pass with one or more luggage tags in the passenger journey document file 160 for a passenger (PAX). The process 600 may be a performed in block 322 of FIG. 3. At block 610, the process 600 calls a function (BuildPDF) that utilizes the BPID and LTID. The BuildPDF function may be a function which call another type of image-based text format file. At block 612, the process 600 may loop through the BPIDs of a batch of BPIDs for a single selection entered via GUI 1400 (FIG. 14A). Process 614 may be a loop process with block 616 to determine whether more boarding passes remain. If the determination is "YES," then at block 616, the process 600 sets the boarding pass read for print now (print=now) and nulls NeedsReprint and AvailableForReprint in the boarding pass record, at block 618. Block 618 loops back to block 616. This process 614 loops for all boarding passes. The GUI 1400 may be updated to reflect the boarding pass is ready to be generated, such as via printing by a peripheral device. The boarding pass needs reprint may be a message to an operator causing reprinting of the TI device.

At block 616, if no boarding passes remain, the process 600 loops through LTIDs at block 620. Process 622 may be a process for looping through the LTIDs. At block 624, a determination may be made if more bags remain. Then at block 626, the process 600 sets the bag ready to print now (Print=Now) and nulls NeedsReprint of the bag (luggage tag). The bags need reprint may be a message to an operator causing the printing of the integrated end-to-end TI device. Block 626 loops back to block 624. The loop of blocks 624 and 626 continues until no bags remain. If no bag remains, then block 624 exists back to block 322 of FIG. 3 for output.

Figure 7A:
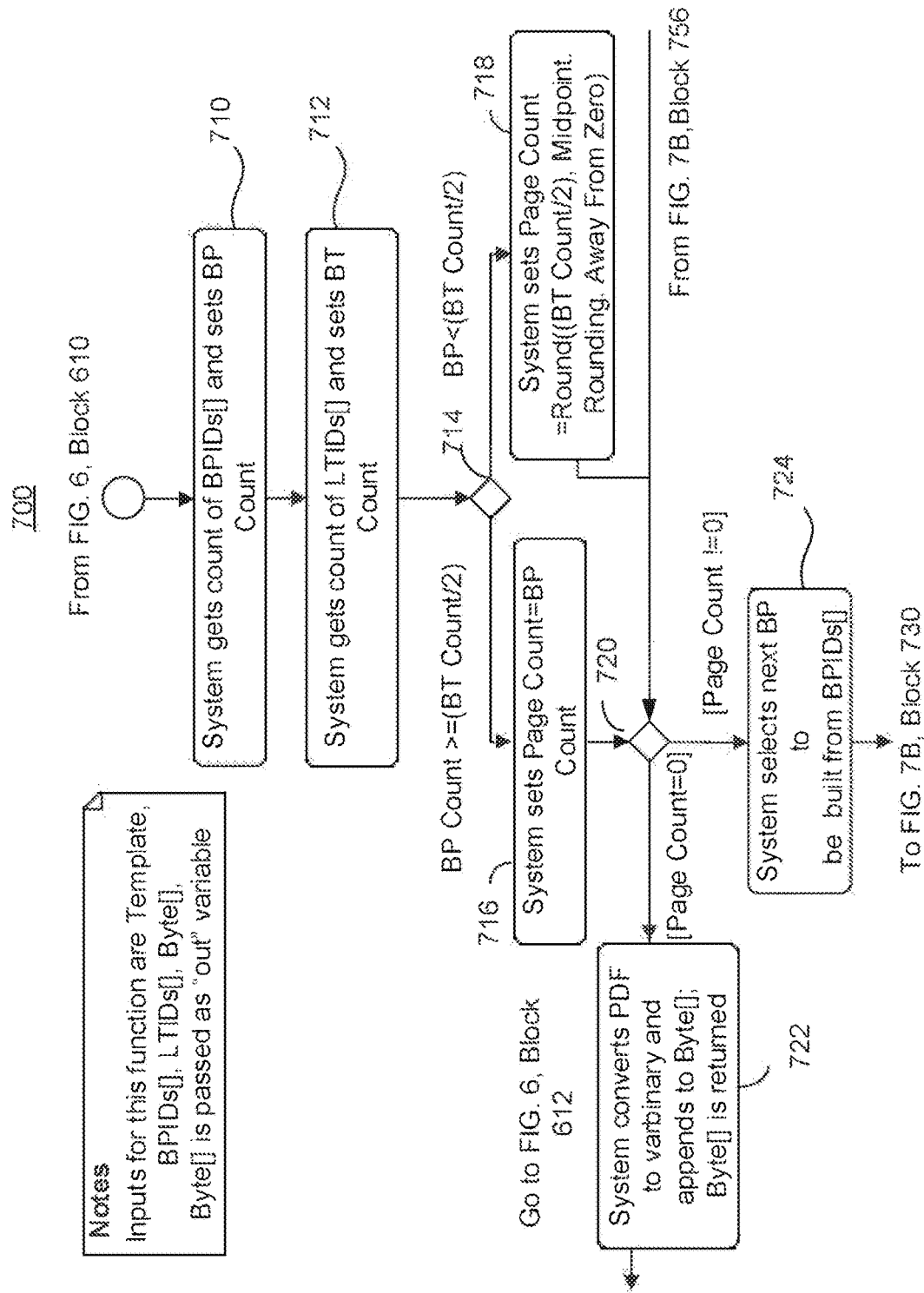
FIGS. 7A-7B illustrate a flowchart for process for drawing the integrated travel instrument (TI) compatible with the template.
Figure 7B:
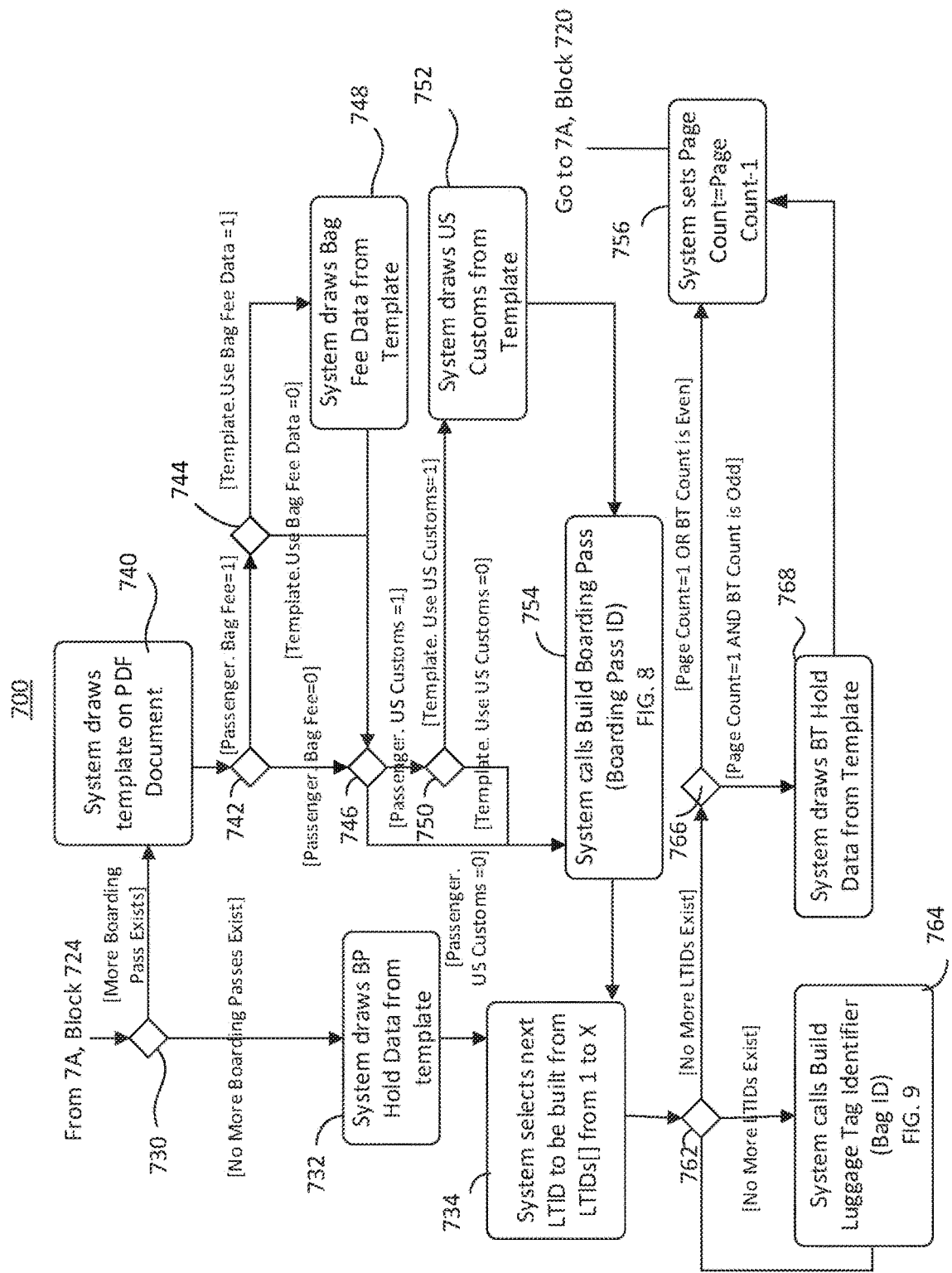

At block 610, the process of FIGS. 7A-7B may be performed. FIGS. 7A-7B illustrate a flowchart for process 700 for drawing the integrated travel instrument compatible with the template. Block 710 begins in block 610 of FIG. 6. At block 710, the process 700 gets the BPIDs and set BPcount (boarding pass count) for a passenger's journey end-to-end. At block 712, the process 700 gets count of temporary LTIDs and sets the bag tag count (BTcount). At block 714, a determination may be made whether the BPcount is greater than or equal to BTCount/2, if so, the process proceeds to block 716. On the other hand, if the BPcount is less than BTcount/2, the page count is set in block 718. At block 716, the system sets page count to equal BPcount. At block 718, system sets page count to rounded (BTcount/2) to the next integer and proceeds to block 720. BTcount corresponds to the number N of needed bag tags or luggage tags. The number X corresponds to the number 2.

At block 720, a determination may be made whether page count is equal to 0. If the page count is equal to 0, at block 722, the process 700 may convert the PDF or other image-based text format file to varbinary and proceeds to block 612 of FIG. 6. The point of this decision at block 720 is to loop through each page required and build the passenger's journey document file. PageCount may be used as a counter that will eventually be equal to O—meaning the process has finished building the set of integrated instruments for the respective passenger. For example, the set of integrated instruments may include one or more boarding pass instruments, each boarding pass instrument on a different sheet. The set of integrated instruments may include on a respective one sheet with a boarding pass instrument and up to X temporary luggage tag identifier so that up to X luggage tag devices can be detached from the boarding pass instrument and subsequently attached to corresponding luggage items.

If at block 720, page count is not equal to 0, then block 720 is followed by block 724. At block 724, the process 700 selects next boarding pass to be built from the BPID and proceeds to block 730 of FIG. 7B. A determination may be made at block 730 whether more boarding passes exist. If so, block 730 proceeds to block 740. If at block 730, it may be determined that there are no more boarding passes, the process 700 may proceed to block 732.

At block 732, the process 700 draws the BPHold data from template. (BPHold is place holder content to be populated in the boarding pass designated section in the event that luggage tags outnumber boarding passes at a ratio greater than, by way of non-limiting example, 2:1 or X:1). At block 734, the process 700 selects the next LTID in a list of LTIDs for the passenger to build from 1 to x. The block 734 receives the retuned parameters described in relation to FIG. 8.

The luggage tag may be built based on a specific THS (company) template format or default template format. At block 762, when no more luggage tag IDs exists, the process proceeds to block 766. At block 766, a determination may be made to determine whether the page count is equal to 1 and the BTcount is "ODD." If so, the system may draw BTHold data according to the template format (BTHold is place holder content to be populated), at block 768. Block 768 may be followed by block 756.

If at block 766 it is determined that the page count is not 1 and BTcount is "EVEN," then block 766 proceeds to block 756 where the page count is decreased by 1. Block 756 flows back to block 720 of FIG. 7A.

Returning again to block 740, the process 700 may retrieve the integrated TI template 124 for the THS and populates the passenger's journey data of the passenger journey document file 160 in a PDF formatted document or other image-based text format file document. At block 742, the process 700 may determine whether the baggage fee is 0. If the baggage fee is 0, block 742 flows to block 746 to determine whether the US Customs information is needed. If the US Custom information is 0, the process 700 flows to block 754. The process of 754 is described in relation to FIG. 8. The value O equals false and the value 1 equal true.

Returning again to block 742, the process 700 may determine whether the baggage fee is 1. If the baggage fee is 1, block 742 flows to block 744 to obtain bag fee data associated with template at block 744 and draws the bag fee in the template, at block 748. Block 748 returns to block 746. Assume the "bag fee" is set to true, thus, the term "draws" means the generation of a corresponding message (verbiage) in alphanumeric characters representative of the bag fee information to populate the integrated TI template. If at block 744 the template bag fee data is 0, block 744 may follow to block 746.

Retuning again to block 746, the process 700 determines whether the US Customs information is needed. If the US Custom information is 1, the process 700 flows to block 750. At block 750, if the template for US Customs is 1, then block 750 flows to block 752 where the US Customs information is retrieved and drawn on the written on the front side (bottom of the BP image). Block 752 may flow to block 754. Otherwise, if at block 750 the template for the US Customs information is 0, then the process 700 flows to block 754. The template for the US Customs information may be pre-written instructions formatted according to the template.

Figure 8:
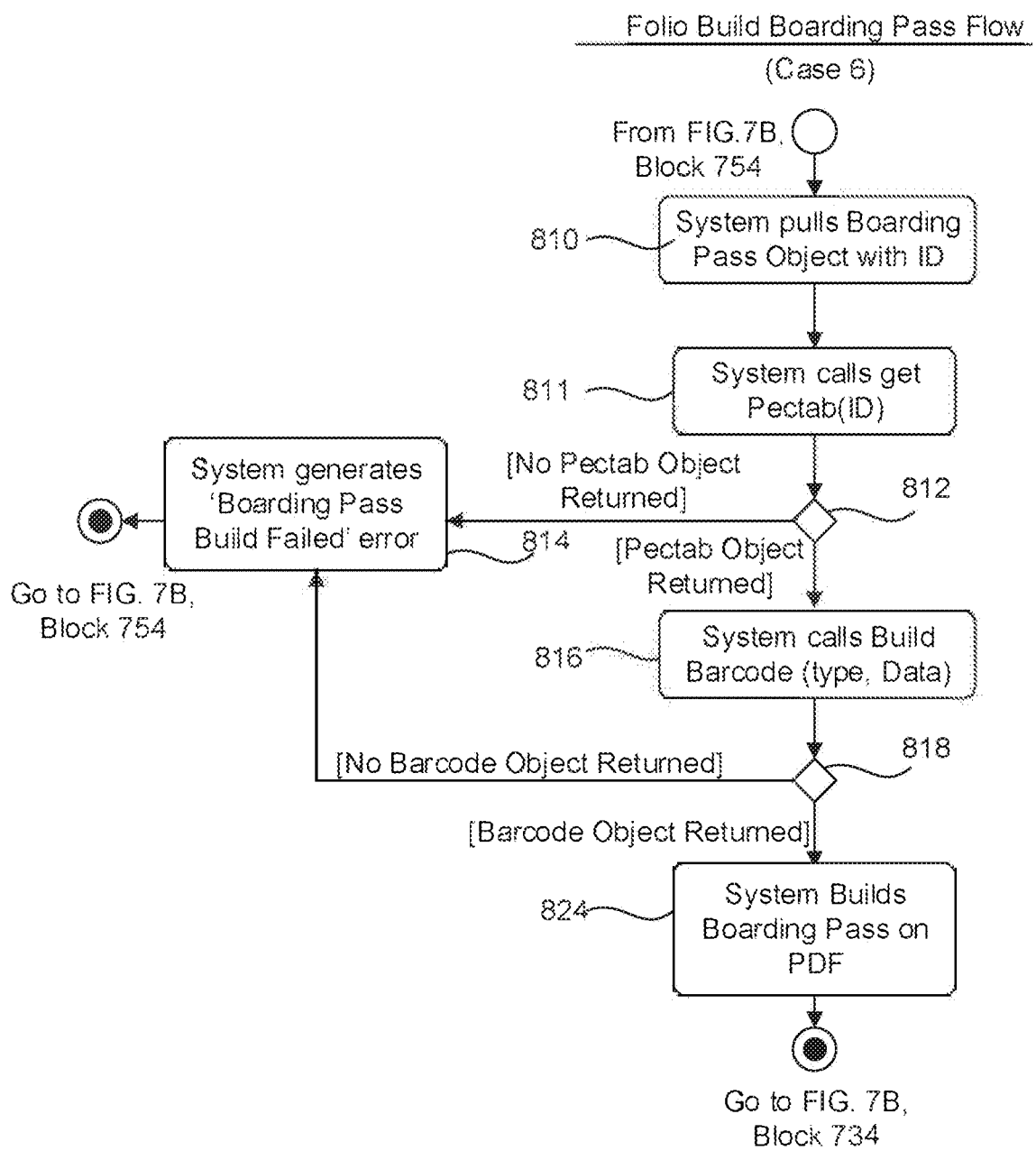
FIG. 8 illustrates a process for building the boarding pass for the integrated TI template.

FIG. 8 illustrates a process 800 for building the boarding pass object for the template. At block 810, the process 800 pulls the boarding pass object with ID during block 754 of FIG. 7B. At block 811, the process 800 gets a PECTAB ID. (PECTAB is a parametric table to map the layout of the boarding pass elements.) In some embodiments, each airline or THS may have its own PECTAB ID or parametric table for the airline's boarding pass elements. Thus, the stored boarding pass stored in the boarding pass record may include the parametric table for which to build a boarding pass object based on the BPID and THS ID At block 812, a determination may be made whether no PECTAB ID object was returned. If no object was returned, the process 800 proceeds to block 814, where an error message may be generated indicative of a boarding pass build failed. The process 800 may proceed to block 754 of FIG. 7B from block 814. At block 812, if a PECTAB ID object was returned, then the system builds an emulated BP barcode at block 816. At block 818, if no barcode is returned, the process loops to block 814. At block 818, if a barcode object was returned, then at block 824, process 800 builds a boarding pass in PDF or other image-based text format file. The process 800, after block 824, returns to block 734 of FIG. 7B.

Figure 9:
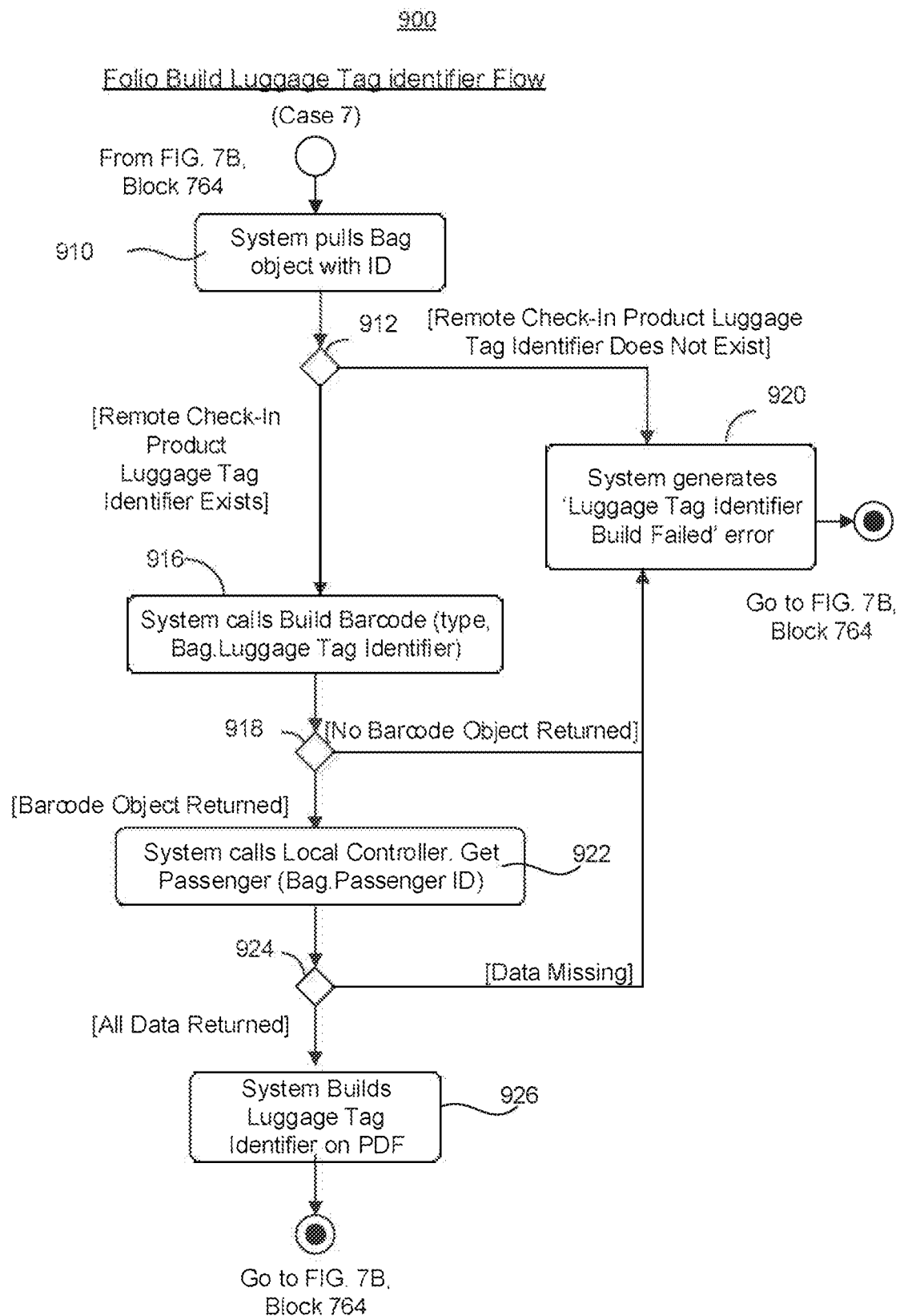
FIG. 9 illustrates a process for building a luggage tag for the integrated TI template.

FIG. 9 illustrates a process 900 for building a luggage tag. At block 910, the process 800 pulls the luggage bag object with the LTID and THS in response to block 764 of FIG. 7B. At block 912, if the luggage tag identifier exists from the remote check-in, the process 900 builds the luggage tag barcode, at block 916. On the other hand, if at block 912 it may be determined that a remote check-in luggage tag identifier (BTID) does not exist, block 912 proceeds to block 920.

The process 900 may generate an error message, Luggage Tag Build Failed, at block 920.

At block 918, if no barcode is returned, the process 900 may loop back to block 920 to produce an error message. If a barcode object is returned, then at block 922, the process 900 may get passenger bag passenger ID and bag number. At block 924, a determination may be made whether data is missing. If data is missing, process 900 loops back to block 920 to produce an error message and goes to block 764 of FIG. 7B. Otherwise, at block 924 it is determined that all data is returned, then the process 900 may build the luggage tag with luggage tag identifier (LTID) and LT barcode in the template for the PDF or other image-based text format file, at block 926. From block 926, the process 900 proceeds to block 764 of FIG. 7B. When the website 110 detects an error, the error message may be display in a window overlaid on GUI 1400 or other GUI at the host check-in system 140.

Figure 10B:
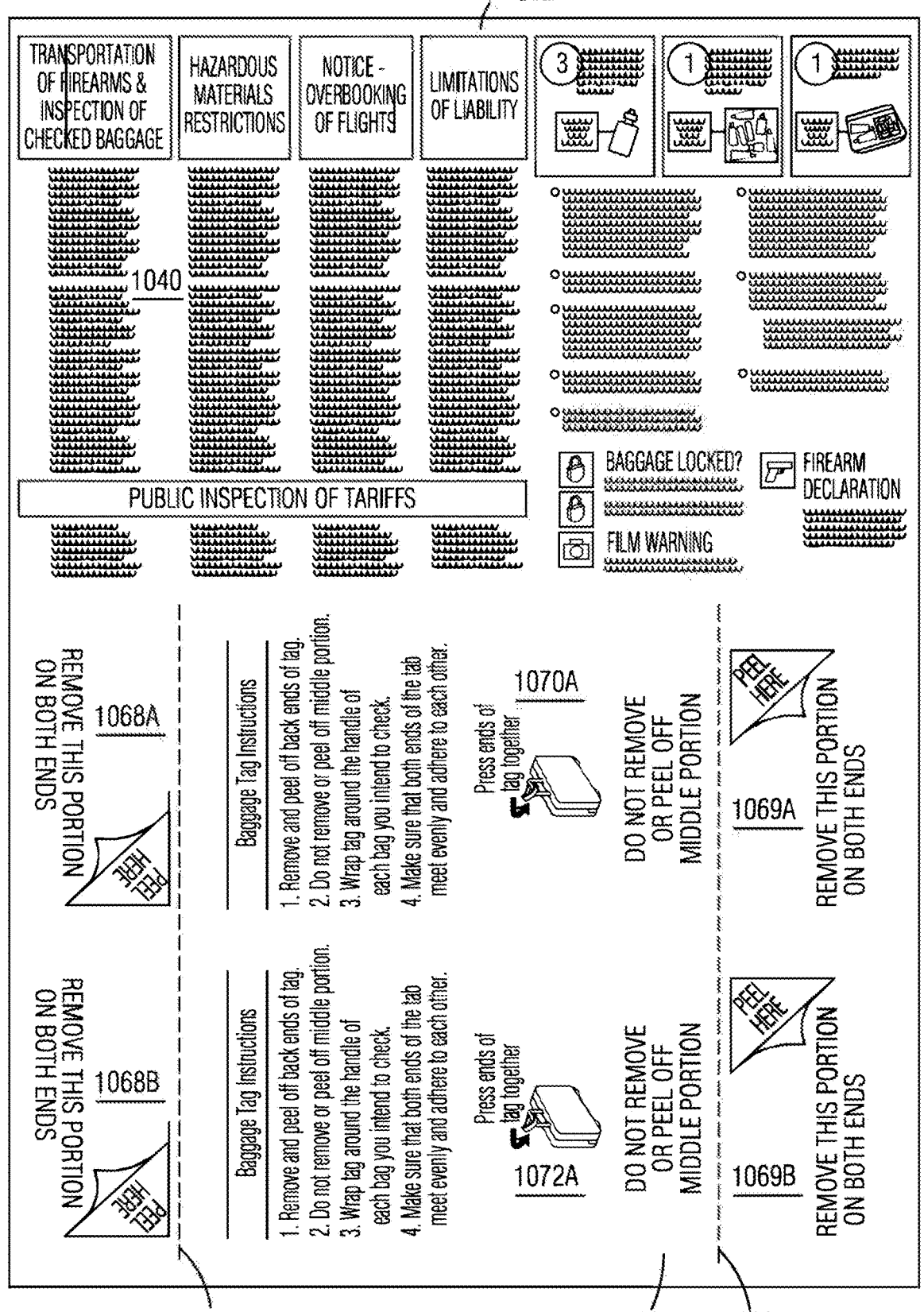
FIG. 10B illustrates a back side of an integrated single-sheet medium.

FIG. 10A illustrates a front side 1001 of an integrated TI template 1000A. The template is only a template of a single-sheet document but with a front side 1001 and a back side 1002 (FIG. 10B). The template may be configured to populate information according to a single-side page format. The template may be constructed to only permit printing on the front of the page or devices 1000C of FIG. 10C. The front side 1001 includes a boarding pass designate section 1020A, a first luggage tag section 1030A and a second luggage tag section 1032A. The first luggage tag section 1030A of the template may include perforated line indicators along the side adjacent to the boarding pass designated section 1020A and the second luggage tag designated section 1032A.

The LTID areas 1057A, 1057B, 1059A and 1059B correspond to designated areas for LTID barcodes. The LTID areas 1057A and 1059A, on opposite sides of the first luggage tag section 1030A, may be used to print thereon the first LTID information and LTID barcode for a first luggage item according to the AEA standard format, but generally diametrically opposing.

The LTID areas 1057B and 1059B, on opposite sides of the second luggage tag section 1032A, may be used to print thereon the second LTID information and LTID barcode for a second luggage item according to the AEA standard format, but generally diametrically opposing. The areas of the first and second luggage tag sections 1030A and 1032A may be used for displaying printed information corresponding to the passenger's name, first travel mode information, if appropriate. The first travel mode may be an airline. Additionally, the first and second luggage tag sections 1030A and 1032A may be used to display printed information corresponding to any transfer to or second travel mode. In this example, a room for a cruise ship may be populated and printed such as for a second travel mode. The order of displaying the first travel mode and the second travel mode information may be changed. The first and second luggage tag sections 1030A and 1032A may only display travel mode information for one mode of travel.

FIG. 1OB illustrates a back side 1002 of a single-sheet integrated medium. The back side 1002 includes pre-printed instructions in instructions area 1040 where area 1040 may provide federal instructions, travel instructions, etc. The pre-printed instructions may be printed on the back side of the single-sheet integrated medium. The area 1040 substantially corresponds with the boarding pass section 1020A on the front side. The back side 1002 may include a first luggage tag section 1070A and a second luggage tag section 1072A formed in the areas of the back side 1002 overlapping the first luggage tag section 1030A and the second luggage tag section 1032A, respectively. The back side may include pre-printed instructions for the separation of the luggage tag sections, and installation or attachment instructions for the passenger (or others) to attach the luggage tag to their luggage. The back side 1002 corresponds to the back or bottom side of the first layer 1065.

The back side 1002 may illustrate two parallel black lines configured to be pre-printed. However, the slits 1063 (FIG. 1OC) may be adjacent to and/or parallel to the parallel lines on the back side. The areas 1068A and 1068B overlap with areas 1057A and 1057B, respectively, and may have pre-printed thereon certain instructions for the generation of first and second luggage tags.

The areas 1069A and 1069B overlap with areas 1059A and 1059B, respectively, and may have pre-printed thereon certain instructions for the generation of first and second luggage tags. The areas, denoted as 1068A and 1068B, and the areas, denoted as 1069A and 1069B, are adhesive covers.

The adhesive covers 1068A and 1069A may be adapted to be lifted from the underlying adhesive to connect opposite ends of the first tag section 1070A such that the AEA compliant LTID information and LTID barcodes for a first luggage item may be visible when attached around a handle, for example, of the first luggage. The adhesive covers 1068B and 1069B may be adapted to be lifted from the underlying adhesive to connect opposite ends of the second tag section 1072A such that the AEA compliant LTID information and LTID barcodes for a second luggage item may be visible when attached around a handle, for example, of the second luggage.

FIG. 1OC illustrates blank integrated end-to-end travel instrument (TI) devices 1O00C on a single-sheet integrated medium which tracks the section of the integrated template shown in FIG. 1OA. FIG. 10D illustrates a cross-sectional view of a longitudinal side of the integrated end-to-end TI devices. FIG. 1OE illustrates a cross-sectional view of a short side of the TI devices.

The blank integrated travel instrument devices 1O00C may be configured to be a first layer 1065 (FIG. 10D and 1OE) which may be a letter size sheet such as 8.5×11 inches or other size. The first layer 1065 may include first and second perforations 1062A and 1062B (FIG. 10D) formed in the sheet to separate the luggage tag designated sections 1030C and 1032C and the boarding pass section 1020C. The perforations 1062A and 1062B may be 2 full width micro perforation. The first perforations 1062A forms a line essentially across the width of the first layer 1065. The second perforations 1062B forms a line essentially across the width of the first layer 1065 and wherein the line may be separate from and in parallel with the first perforations 1062B. The adhesive covers 1068A and 1069AC may be configured to be tear proof except along the perforations 1062A and 1062B. Additionally, the paper stock of the first layer 1065 may be configured to be used in a laser printer such that the printed characters and data may be generated so that it does not smear or chip. In other words, the integrated travel instrument may be tear proof and smear proof.

The integrated end-to-end TI devices 1O00C further includes a first, second layer portion 1060, denoted as a solid area, and a second, second layer portion 1061 denoted by the hatched area with diagonal lines. The first and second, second layer portions 1060 and 1061 may include at least one coating configured to be applied to a top side of the first layer 1065 material. In some embodiments, the coating of the first second layer portion 1060 may be different from the coating of the second, second layer portion 1061. The coating of at least the first second layer portion 1060 may be adapted to be printed thereon by a printer. The coatings may provide thin layers of laminated section or glossy sections on the top side of the first layer 1065.

The integrated travel instrument devices 1O00C may include a third layer forming top layers 1030C and 1032C. The third layer 1030C may include a first luggage tag layer applied over the coating in the first luggage tag section 1030. The third layer 1032C of the integrated travel instrument device 1000C may include a second luggage tag layer applied over the coating in the second luggage tag section 1032. Depending on the size of the first layer 1065 and the number of luggage tag sections, the third layer may include additional luggage tag layers. Additionally, the first layer may include additional perforations in parallel and between additional luggage tag layers.

The second layer portion 1061 may be applied over the front/top side of the first layer 1065. The coating of the second layer portion 1061 may be configured to be part of the adhesive protector or cover (i.e., adhesive protectors or covers 1068A, 1068B, 1069A and 1069B), described in more detail below. The adhesive protectors or covers 1068A, 1068B, 1069A and 1069B allow a portion of the first layer 1065 to be pulled off without affecting the adhesive properties of the adhesive layer portions 1052 and 1053 which comprise an adhesive overlaid on the top side of the coating of the second layer 1061 applied to the first layer 1065. The adhesive protectors or covers allow a portion on opposite sides of the first (top) luggage tag layer 1030C in the designated sections to be pulled off without affecting the adhesive properties such that the adhesive layer portion 1052 overlaid on the top side of the first layer 1065, at section 1065B. The adhesive protectors or covers allow a portion on opposite sides of the second (top) luggage tag layer 1032C in the designated sections to be pulled off without affecting the adhesive properties such that the adhesive layer portion 1053 overlaid on the top side of the first layer 1065, at section 1065C. The first layer portions $1065C^1$, $1065C^2$ and $1065C^3$ may be positioned under the tag layers 1030C and 1032C. Tag layers 1030C and 1032C may be parallel and separated by perforations.

There may be a back slit 1063 for each adhesive protector vertically formed in at least the first layer 1065 to form adhesive covers 1068A, 1068B, 1069A and 1069B. The black line in FIG. 10C does not denote that the slit is formed in the first tag layer 1030C and the second tag layer 1032C. Instead, the slit 1063 may be formed in the first layer 1065 and resides under the first tag layer 1030C and the second tag layer 1032C. The slit 1063 may be formed by perforations.

The slit 1063 may allow only part of the adhesive to be exposed when the first luggage tag layer 1030C and the second luggage tag layer 1032C are removed. The luggage tag layer may be 8.25 inches wide and 2 inches tall. The first layer 1065 may include paper stock to print the integrated travel instrument. The first layer 1065 may be a laser ledger sheet. The laser ledger sheet may include a 28 lb. sheet. In an embodiment, the TI devices 1000C may include different sizes such as for different number of bag tags. For example, for three bag tags, a larger sheet may be used to expand the areas for luggage tags to three or more. Each luggage tag would have a corresponding luggage tag layer. In an embodiment, each luggage tag layer may include a paper sublayer configured to have printed thereon luggage tag information. Each luggage tag layer may include an adhesive layer under the paper sublayer. The adhesive layer is under the first and second tag layers 1030C and 1032C and may cover the entire area of the luggage tag layer. However, removing the luggage tag section along the perforations, allows the luggage tag layer 1030C or 1032C to be bent along the slits 1063.

The blank integrated end-to-end TI devices 146 (FIG. 1A) may include in a first luggage tag designation section 1030A to form a first luggage tag device 1035 for selectively populating thereon a first LTID and luggage tag barcode for the respective one passenger, when the number N is determined to be at least one. Thus, the system selectively builds a first luggage tag on the first tag layer 1030C of the first luggage tag device 1035. The integrated end-to-end TI devices 1O00C has a first edge comprising a first perforation dividing line 1062A being adjacent to the boarding pass designated section 1020C. The first perforation dividing line 1062A may be configured to detach the first luggage tag device 1035 from the boarding pass designated section 1020C, after the boarding pass and luggage tags have been printed or generated. The first luggage tag device 1035, after being attached, may be attached to a first luggage item. Perforation dividing line 1062A separates the first layer 1065 into first layer sections 1065A and 1065B, corresponding to the boarding pass designation section and first luggage tag designation section, respectively. The perforation dividing line 1062B separates the first layer 1065 into first layer sections 1065B and 1065C, corresponding to the first luggage tag designation section and the second luggage tag designation section, respectively. The first layer sections 1065B and 1065C may serve as the protective covers 1068A and 1068B.

The integrated end-to-end TI devices 1O00C may comprise a second edge parallel to the first edge comprising a second perforation dividing line 1062B on an opposite side of the first luggage tag designation section 1030C. A second luggage tag designation section 1032C may be provided between the second perforation dividing line 1062B and an edge or distal end of the single sheet of the integrated end-to-end TI devices 1O00C. The second luggage tag designation section 1032C may be part of a second luggage tag device 1037 for selectively populating a second LTID and luggage tag of the respective one passenger on the second tag layer 1032C. The second luggage tag designation section 1032C may be adjacent to the second perforation dividing line 1062B. The second luggage tag designation section 1032C may be printed with the second LTID and luggage tag on the second tag layer 1032C when the number N of luggage items is determined to be at least 2 (or greater than 1) to form a second luggage tag. The second luggage tag may be attached to a second luggage item.

The first and second luggage tag device 1035 and 1037 may be configured to loop around handles of a luggage item. Thereafter, free ends or opposite ends of the devices may be adhesively attached or fastened.

Figure 11:
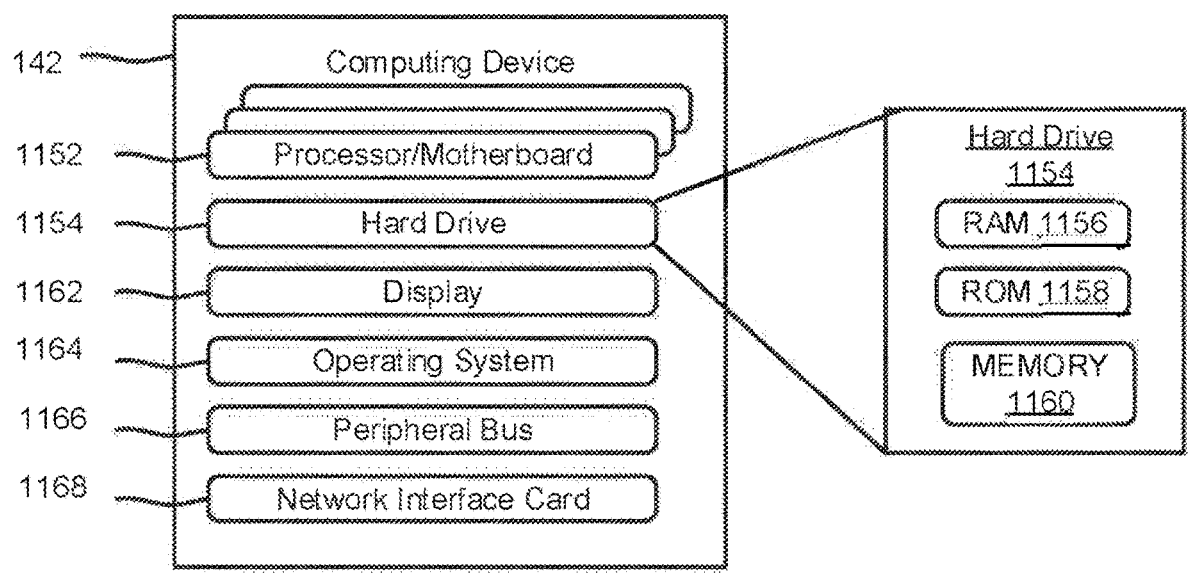
FIG. 11 illustrates a block diagram of a computing device.

Referring now to FIG. 11, in a basic configuration, the computing device (CD) 142 may include any type of stationary computing device, mobile computing device or webserver. Computing device 142 may include one or more processors 1152 and system memory in hard drive 1154. Depending on the exact configuration and type of computing device, system memory may be volatile (such as RAM 1156), non-volatile (such as read only memory (ROM 1158), flash memory 1160, and the like or some combination of the two. System memory may store operating system 1164, one or more applications, and may include program data for performing the methods and processes described herein in FIGS. 2, 3, 4, 5, 6, 7A-7B, 8, 9, 15 and 16A-16C. The computing device 142 may carry out one or more blocks of processes in FIGS. 2, 3, 4, 5, 6, 7A-7B, 8, 9, 15 and 16A-16C. The webserver may include webserver applications for communicating with remote (client-side) computing devices over the Internet.

Computing device 142 may also have additional features or functionality. For example, computing device 142 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage may be all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which may be used to store the desired data, and which may be accessed by computing device. Any such computer storage media may be part of device. The storage media may include tangible, non-transitory computer readable storage media.

Computing device 142 may also include or have interfaces for input device(s) (not shown) such as a keyboard, mouse, pen, voice input device, touch input device, etc. The computing device 142 may include or have interfaces for connection to output device(s) such as a display 1162, speakers, etc. The computing device 142 may include a peripheral bus 1166 for connecting to peripherals. Computing device 142 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media.

The computing device 142 may include a network interface card 1168 to connect (wired or wireless) to a network. Computer program code for carrying out operations described above may be written in a variety of programming languages including, but not limited to, a high-level programming language, such as C, C++, C#, for development convenience. In addition, computer program code for carrying out operations of embodiments described herein may also be written in other programming languages such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described may be included as a firmware in a RAM, a ROM and a flash memory. Otherwise, the code may be stored in a tangible computer-readable storage medium such as a magnetic tape, a flexible disc, a hard disc, a compact disc, a photo-magnetic disc, a digital versatile disc (DVD). The code may be stored in a non-transitory, tangible computer-readable storage medium. The website may be hosted on a cloud server.

The embodiments may be configured for use in a computer or a data processing apparatus which includes a memory, such as a central processing unit (CPU), a RAM and a ROM as well as a tangible, non-transitory computer readable storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special-purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

FIG. 12A illustrates a first example of integrated TI devices 1200A on a single-sheet integrated medium. The boarding pass section 1220A includes a top paragraph providing format. The boarding pass instrument 1210A may be for a flight. An emulated BP barcode 1211 may be provided at a location which may be defined by the airline or other THS template configuration. The boarding pass designated section 1220A may include a bag tag identifier (BTID) section for applying the official BTID 1209 as part of the boarding pass instrument 1210A. The BTID section may be shown outside of the border defining the boarding pass instrument 1210A. However, the BTIDs 1209 may be printed within the border of the boarding pass instrument 1210A. The boarding pass instrument 1210A may include other journey information including the THS, the date and time, the departing location, destination location, PAXID, etc. The boarding pass instrument 1210A may be useable by the passenger to enter a travel vehicle such as an airplane when the THS is an airline, without the need for the passenger to obtain another boarding pass to enter the travel vehicle.

The luggage tag devices 1229A and 1229B are also shown with the passenger name, flight number (1339), flight time, room number and LTID barcodes 1231A and 1233A on opposite ends of the luggage tag designated sections 1230A and 1232A, respectively. A numerical value of a respective LTID may be adjacent its corresponding LTID barcode. The luggage tag devices 1229A and 1229B once printed and removed from the boarding pass instrument 1210A become separated luggage tag devices which may be individually attached to a luggage item associated with the passenger to be temporarily checked-in. the luggage tag devices 1229A and 1229B may include an airline or THS indicator 1237. The temporarily checked-in luggage items with the luggage tag devices 1229A and 1229B may be transported by the cruise line or other third-party vendor without the need for the passenger or traveler to transport their luggage items to the THS. The passenger may keep in their possession, carry-on baggage items. The airline or THS indicator 1237 may allow luggage handlers to direct the luggage items more efficiently. In some embodiments, when the luggage items may be transported to the THS or other holding location, the temporary luggage tag devices may be removed and/or replaced with an official bag tag matched to the LTID on the temporary luggage tag device. The BTID numerical code may be maintained by the passenger via the markings on the boarding pass instrument.

FIG. 12B illustrates a second example of integrated TI devices 1200B on a single-sheet integrated medium. The boarding pass section 1220B includes a top paragraph providing format. The boarding pass instrument 1210B for the flight includes an emulated BP barcode 1211 which may be readable by the THS. In section 1230B, a luggage tag device 1229A may be shown with a passenger name, flight number and LTID barcodes 1231A. Only one tag was generated since the passenger has only one bag or luggage item, for example, to be checked. The second luggage tag section may be blank if there are no more luggage tags. The blank luggage tag device may be removed or detached from the other printed luggage tag device. In some embodiments, a note to the passenger may be printed in the blank luggage tag section. The note may be a message defined in the airline template or THS template to detach and discard.

FIG. 12C illustrates a third example of integrated travel instrument devices 1200C on a single-sheet integrated medium. The third example is similar to the first and second examples. Therefore, only some of the differences will be described for the sake of brevity. The boarding pass section 1220C includes a boarding pass instrument 1210C. The boarding pass instrument 1210C illustrates a different location for the placement of the emulated BP barcode 1211. In this example, another barcode 1213 may be provided on the boarding pass instrument 1210C.

Figure 13:
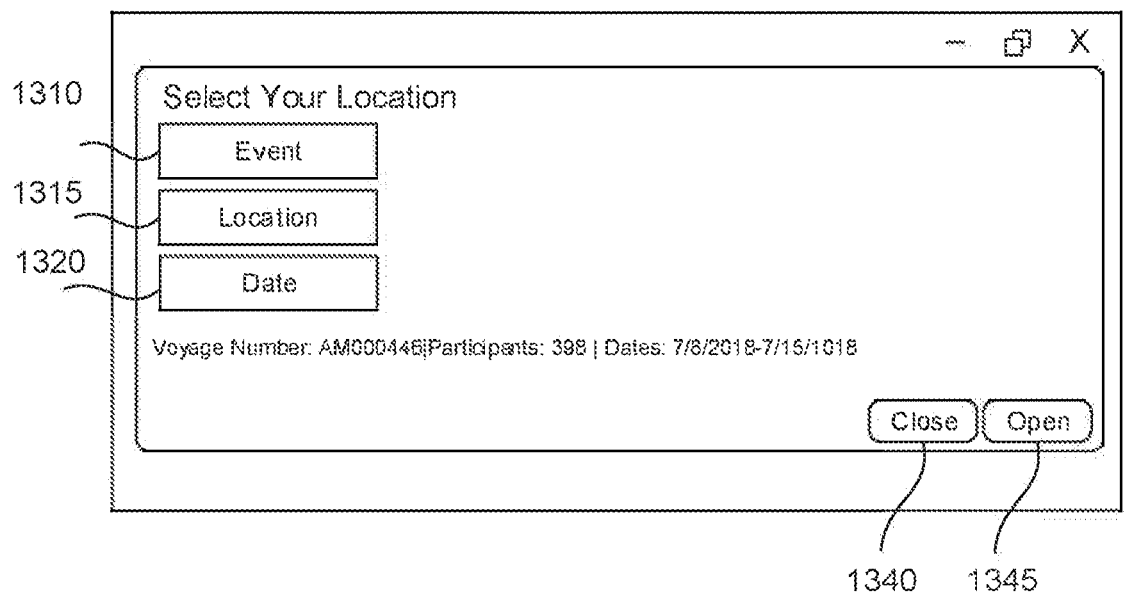
FIG. 13 illustrates a graphical user interface (GUI) for accessing location and event.

FIG. 13 illustrates a graphical user interface (GUI) 1300 for accessing a location and event. The GUI 1300 may include a field 1310 to identity the company/partner using the system, for example. The GUI 1300 may include a field 1315 for selecting the site or site location. For example, an event in which the passengers are debarking from a cruise ship or departure from another location, such as a hotel or venue with a transfer to a flight, for example. A cruise ship may be a type of THS and part of the end-to-end journey. In other embodiments, an event may be related to a passenger debarking from an event travel host system (ETHS), such as a train system or bus system with a transfer to a flight. In other embodiments, the event may include one or more flights which are not also related to another travel host system, such as a cruise ship, train or bus. Furthermore, the end-to-end journey may include one or more flights using different airline companies. The GUI 1300 further includes a close button 1340 and an open button 1345. The selection of the open button 1345 retrieves passenger information for one or more passengers associated with an event, if applicable, which is displayed in a populated GUI 1400 of FIG. 14A. The GUI 1300 may display the number of participants with the THS identifier to have advance bag tags printed prior to demarking from the cruise ship, for example. The GUI 1300 may display a date range associated with the event, for example. The GUI 1300 may include a data field 1320.

FIG. 14A illustrates a GUI 1400 for local check-in, managing boarding pass and bag tag generation. The GUI 1400 displays a populated list of passenger information for a current manifest, for example, associated with a particular point of departure. The point of departure may be associated with a cruise line or ETHS. The point of departure may have a manifest (i.e., manifest file 10) associated with passengers disembarking the cruise line. In other embodiments, the point of departure may have a manifest associated with a resort location or other venue. In some embodiments, the GUI 1400 may include a list of passenger information based on other selection criteria. The manifest may be in a manifest file 10.

The passenger information in a row, such as row 1435, from the manifest may be arranged in a plurality of columns to form a passenger travel journey record. A passenger information column, in this example, may include a room/cabin number field 1402 associated with a cruise ship, train, or other type of THS, including a resort or hotel. Passenger information columns may include the PAXID data fields including a last name 1404 and first name 1406 of the passenger. A passenger information column may further include a field for an airline 1408. A passenger information column may include a field for a flight number 1410 with the passenger. If the THS is a train, for example, in lieu of a flight number 110, the train number, bus number or ship number may be used. A passenger information column may include field for time and date information 1412 associated with the flight number 1410 or, in other embodiments, the train number or bus number for which the passenger will transfer to upon disembarking. The time and date information may be related to a first flight for which the passenger departs the location of a cruise ship or other location. For example, a passenger may after departing a cruise ship may take a flight home (a return final destination). In some embodiments, the flight home may be a non-stop flight. However, on other embodiments, the flight home may have one or more stops. The display flight information may include only the first flight. A passenger information column may include a field representative of a journey 1414.

The GUI 1400 may include a passenger information column for indicating whether a boarding pass (BP) 1416 has been generated. Not all passengers on a cruise ship will transfer to a flight or other mode of travel that requires a boarding pass. The GUI 1400 may include a passenger information column for indicating a number of boarding passes (BP) 1416. The GUI 1400 may include a passenger information column for a number N of bags (Bag #) 1418. The number in the field includes a total count of bags (luggage items) a passenger has. The GUI 1400 may include a passenger information column for a number of tags 1420 to be generated. The number of tags 1420 correspond to the number of luggage items the passenger intends to check-in which requires a luggage tag device. The GUI 1400 may include a passenger information column for identifying a current status 1422 of a passenger. The GUI 1400 may include a passenger information column for a debark group 1424. A debark group 1424 may identify which passengers may be associated with passengers of a group traveling together. The GUI 1400 may include a passenger information column for indicating whether the passenger documents are ready (Doc Ready) 1426. The operator of the GUI 1400 may determine certain passengers do not have their documents ready including a boarding pass and/or luggage tag. The GUI 1400 may include a passenger information column for indicating whether the passenger documents (boarding pass and/or tag) have been printed 1428 or generated. Thus, the GUI 1400 tracks and updates the print column for each passenger integrated TI devices being created by printing on the single-sheet integrated medium. The GUI 1400 also updates the Doc Ready column as the website 110 generates the passenger journey document file ready indicator. Once the Doc Ready column identifies the documents are ready by a Yes or No, the operator may then print the passenger journey document file for the creation of the TI devices.

The GUI 1400 may be shown with a subset of passengers being selected which do not currently have documents ready. There may be various reasons for the document not being ready. For example, the operator of the GUI 1400 may need to request the generation of the passenger document file by the webserver 112 which can then be subsequently printed. In this example, the selected passengers in the subset may be within the box 1437 around the passenger information with a dash, dot line format. The box 1437 is intended to represent a selected or highlighted group of rows wherein each row may be associated with a different passenger and may represent a user selected batch. Each different passenger row includes information associated with the passenger travel reservation (PTR) record. The record includes information associated with the columns described herein in the GUI 1400. In other scenarios, the field for doc ready 1426 may be indicated as "No" until the passenger document file is generated by the webserver 112 although a request for generation of the passenger document file has been requested. The Doc Ready indicates whether the necessary information to generate the passenger's end-to-end integrated travel instruments has been prepared. The columns for Doc Ready 1426, Status 1422 and Printed 1428 may be updated in real-time or near real-time.

Figure 14B:
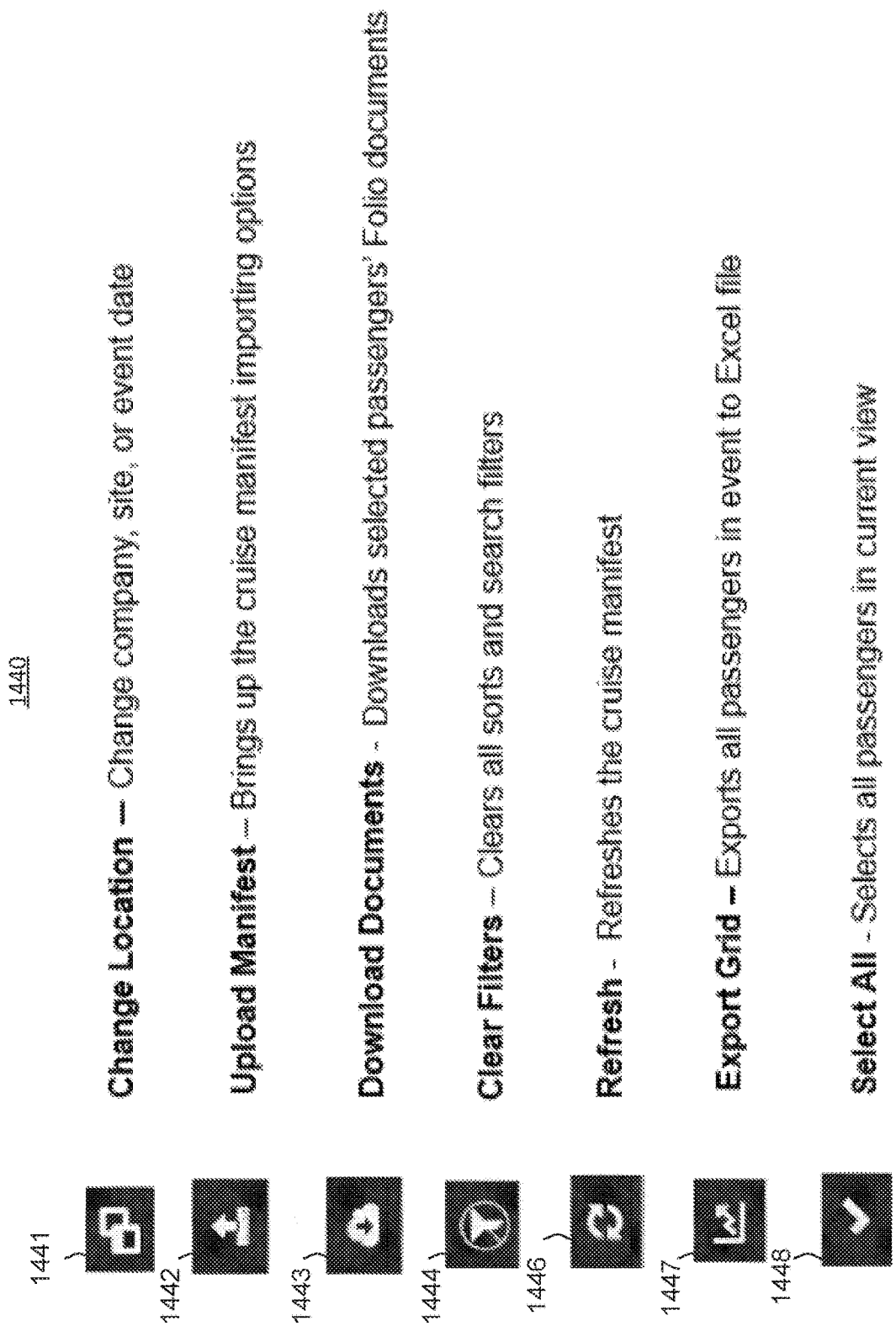
FIG. 14B illustrates a set of control icons associated with the GUI of FIG. 14A.

The GUI 1400 may include a tool set of control icons 1440 described in relation to FIG. 14B. The GUI 1400 may include a row 1430 having a plurality of search fields. Each search/filter field may be a blank data entry field associated with a corresponding column of the plurality of columns. The data in the columns may be sorted based on ascending order or descending order. The GUI 1400 further includes a status summary field 1444 including information related to at least one of a connection, number of enrolled passengers, number of issues, number of locally checked-in passengers, number of canceled passengers and a total of passengers. The connection may indicate whether the computing device is online. The status summary field 1444 may be updated in real-time as passengers are locally checked-in, canceled, etc.

A canceled status may indicate that a flight or other mode of travel has cancelled the reservation, such as for mechanical malfunction of a travel vehicle or inclement weather, by way of non-limiting example.

FIG. 14B illustrates a tool set of control icons 1440 associated with the GUI 1400 of FIG. 14A. The tool set of control icons 1440 may include a "Change Location" button or icon 1441 configured to change the THS company, site and/or event manifest data. The tool set of control icons 1440 may include an "Upload Manifest" icon 1442 configured to upload a travel manifest, such as without limitations, a cruise ship manifest. Additional icon options (not shown) may be provided. The tool set of control icons 1440 may include a "Download Documents" button or icon 1443 configured to download selected passenger's documents, such as for printing. The tool set of control icons 1440 may include a "Clear Filters" button or icon 1444 configured to clear the search filters such as on row 1430. The tool set of control icons 1440 may include a "Refresh" button or icon 1446 configured to refresh a manifest, such as a cruise manifest. The tool set of control icons 1440 may include an "Export Grid" button or icon 1447 configured to export all passengers associated with an event to an Excel file or other file format. The passengers may be those populated in the GUI 1400. The tool set of control icons 1440 may include a "Select All" icon 1448 configure to select all passenger entries in a current view of the GUI 1400. The list of columns includes a Filter/Tab designator listed in Table 1.

TABLE 1

| Filter/Tab Title | Description |
| --- | --- |
| Room | Passenger's room |
| Last Name | Passenger's last name |
| First Name | Passenger's first name |
| Airline | Airline's two-digit code (ex: Southwest = WN) |
| Flight | Passenger's flight number |
| Time | Passenger's flight date and time |
| Journey | Flight path (ex: MCO to LAX) |
| BP | Number of boarding passes processed and available to print |
| Bags | Number of bags passenger requested |
| Tags | Number of preliminary airline tags processed and available to print |
| Status | State of the passenger in the processing program |
| Debark Group | A field used to group passengers for disembarkation (ex: B6, AAAA) |
| DocReady | If the passenger's documents are currently available to be printed |

The GUI 1400 may be configured to, upon receiving selection of the "Upload Manifest" button or icon 1442, upload a travel manifest of an event THS from which passengers may depart and continue on a journey. In this example, the event THS is a cruise ship. The travel manifest includes a list of passengers associated with an event, for example. An event may be a voyage between a certain date range and/or to a particular destination. When the event hosted by the event THS is complete, passengers disembark and may continue on a journey, such as home or another destination. The journey may include one or more additional THSs. Assume, some of the passengers will disembark or leave the event THS and transfer to another journey THS. The passenger may arrive at the journey THS via bus, taxi, foot, etc. However, the luggage items will be taken from the event THS to the journey THS, such as an airline. These luggage items to be checked-in with the journey THS will be checked-in.

The filter/tabs of the GUI 1400 allow the arrangement of rows of the displayed passenger entries to be varied. For example, clicking or selecting a particular filter/tab causes a filtering order to be controlled. The filtering order may be controlled globally by descending order or ascending order numerically or alphabetically, for example. The filtering order may allow the operator to enter an airline identifier, a THS identifier, if the passenger has a travel reservation for a leg of travel. The identifier in the corresponding field may allow only those passengers associated with the selected airline identifier or THS identifier to be displayed in the GUI grid. Other filtered passenger sets may be created such as by "Status," "Group," etc. The GUI grid may be filtered by a particular one flight number.

To print passengers' journey document files and generate the integrated end-to-end TI devices, the operator may download, via the GUI 1400, up to 100 passengers, for example, in one document download batch to avoid downloading delays. In some embodiments, the GUI 1400 may be configured to only print those passenger's journey document files in an accepted status such as without limitation "Checked-In" and "48 Hour".

The GUI 1400 allows the operator to select the passenger(s) that need TI devices generated, such as by using a user interface (i.e., mouse, touch sensitive display, pen or stylus, keyboard) which highlights those rows associated with the passenger's name. Alternately, the operator may also select passengers by holding the control button and selecting passengers individually or selecting a range of passengers by holding the shift key down on a keyboard while clicking the passengers at the beginning and end of the range or press a "Select All" button or icon 1448 which will select all passengers in the view. The "Select All" button or icon 1448 corresponds to the check mark icon in the tool set of control icons 1440 of the GUI 1400.

Using the GUI 1400, the operator may click the "Download Documents" button or icon 1443 displayed in the tool set of control icons 1440 of the GUI 1400. Upon the GUI 1400 receiving the command to download documents, the passenger journey document files may be downloaded from the website 110 in the order they appear on the grid/list. Once the download is complete, a batch file indicator is download in and displayed by the GUI 1400 or browser. When the GUI 1400 receives a command representative of clicking or selecting the batch file indicator, the GUI 1400 opens the batch file within the display screen.

The operator needs to verify that the single-sheet integrated media and no other paper or media is filled in the printer device or peripheral device prior to printing the batch file of downloaded passenger journey document files. When the batch file of downloaded passenger journey document is open, a print icon may be displayed via the GUI 1400. The operator may press Ctrl+P using a keyboard or click on a print icon of the GUI 1400. Once the print command is received by the GUI 1400 based on the selection of the print icon by the operator causes the batch file to be buffered for printing by the designated printer, such as a laser printer.

To export data from the GUI 1400, the open event being displayed may be downloaded to a subsequent manifest processed file. For example, the displayed grid listing the passengers and related records may be exported to a different file format upon receiving a selection or command indicative of selecting or clicking the "Export Grid" button or icon 1447 in the tool set of control icons 1440 of the GUI 1400.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 15:
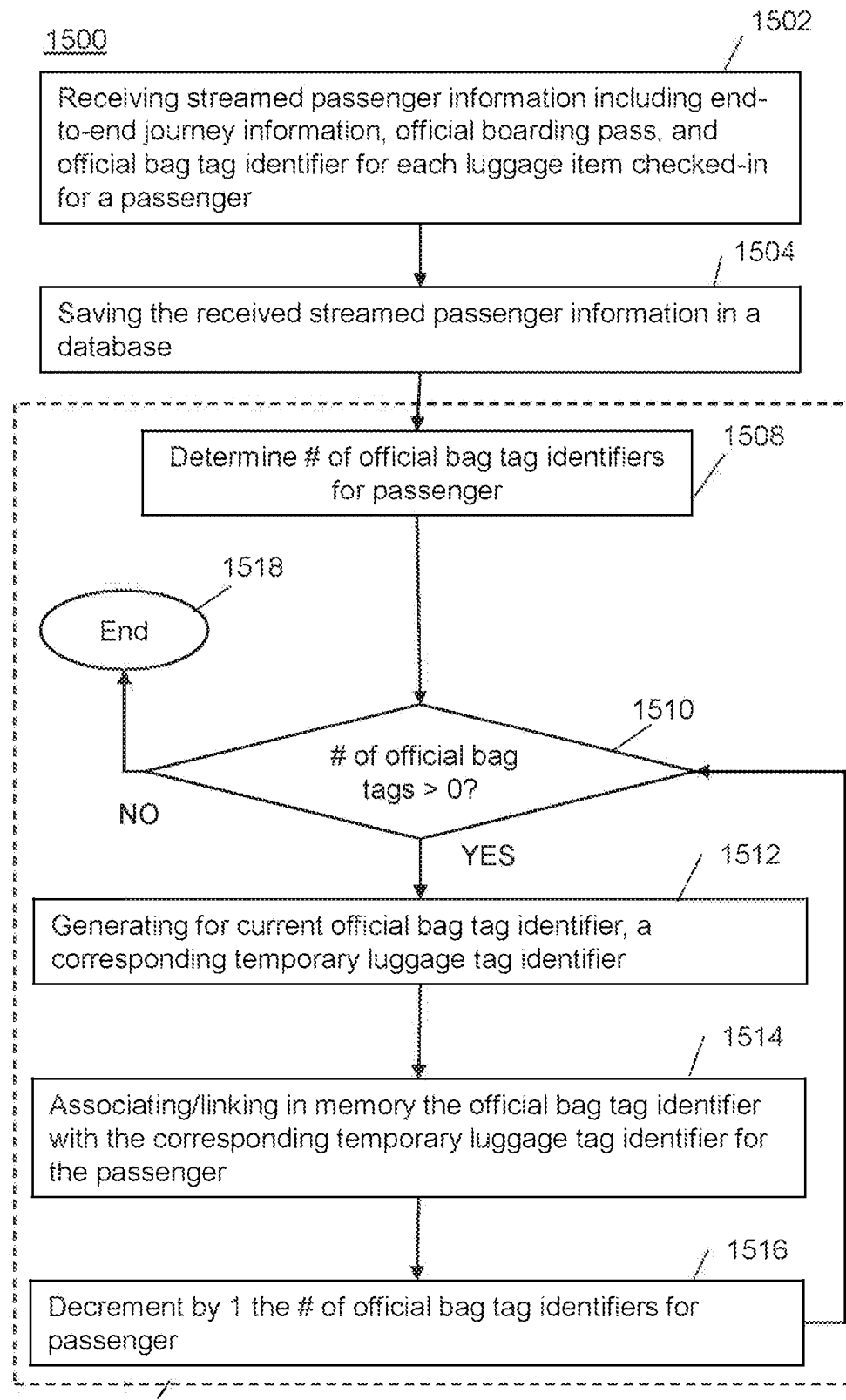
FIG. 15 illustrates a flowchart of a method for collecting passenger information for an end-to-end journey during a remote check-in period.

FIG. 15 illustrates a flowchart of a method 1500 for collecting passenger information for an end-to-end journey. The method 1500 may comprise, at block 1502, receiving streamed passenger information including passenger identification (PAXID), end-to-end flight, journey, or travel reservation information, at least one official boarding pass identifier (BPID), and an official bag tag identifier (BTID), for each luggage item to be checked-in. An official BPID may be required for each leg of the journey, such as for changing flights, changing THS or changing the travel mode.

The method 1500 may comprise, at block 1504, saving the received streamed passenger information in a database. The database may be stored in a memory device. The method 1500 may comprise, at block 1506, generating for a passenger with at least one luggage item to be checked-in, a temporary luggage tag identifier (LTID) for each individual luggage item associated with the passenger. Each generated temporary LTID is then linked to a respective official BTID wherein there is a one-to-one correspondence between the official BTID for a luggage item and the generated LTID for the same luggage item.

Specifically, the block 1506 of the method 1500 may comprise, at block 1508, determining the number of official BTIDs for the current passenger. At block 1510, if the number of official BTIDs is determined to be greater than 0 for the current passenger, then the method, at block 1512, may generate a temporary luggage tag identifier (LTID) for the current official BTID. The block 1506 of the method 1500 may comprise, at block 1514, associating/linking in a database stored in memory the official BTID with the corresponding temporary LTID for the passenger.

The method 1500 may comprise, at block 1516, decrementing by 1 the # of official bag tag identifiers for the current passenger. Block 1516 loops back to block 1510, so that for each official BTID for the passenger, a temporary LTID may be generated, at block 1512, and linked to the official BTID in a database, at block 1514. The official bag tag count may be decremented until each time a LTID is generated for each official BTID.

Once all of the official BTIDs have been processed and the number of official BTIDs for the current passenger is 0 (zero), then at block 1510, the method proceeds to block 1518 and ends the process for the current passenger. The method 1500 may be repeated for each passenger associated with one or more travel departure sites requiring an official boarding pass of an issuing Travel Host System (THS) and/or official bag tag identifiers for tracking luggage items to be checked-in with the THS.

Figure 16B:
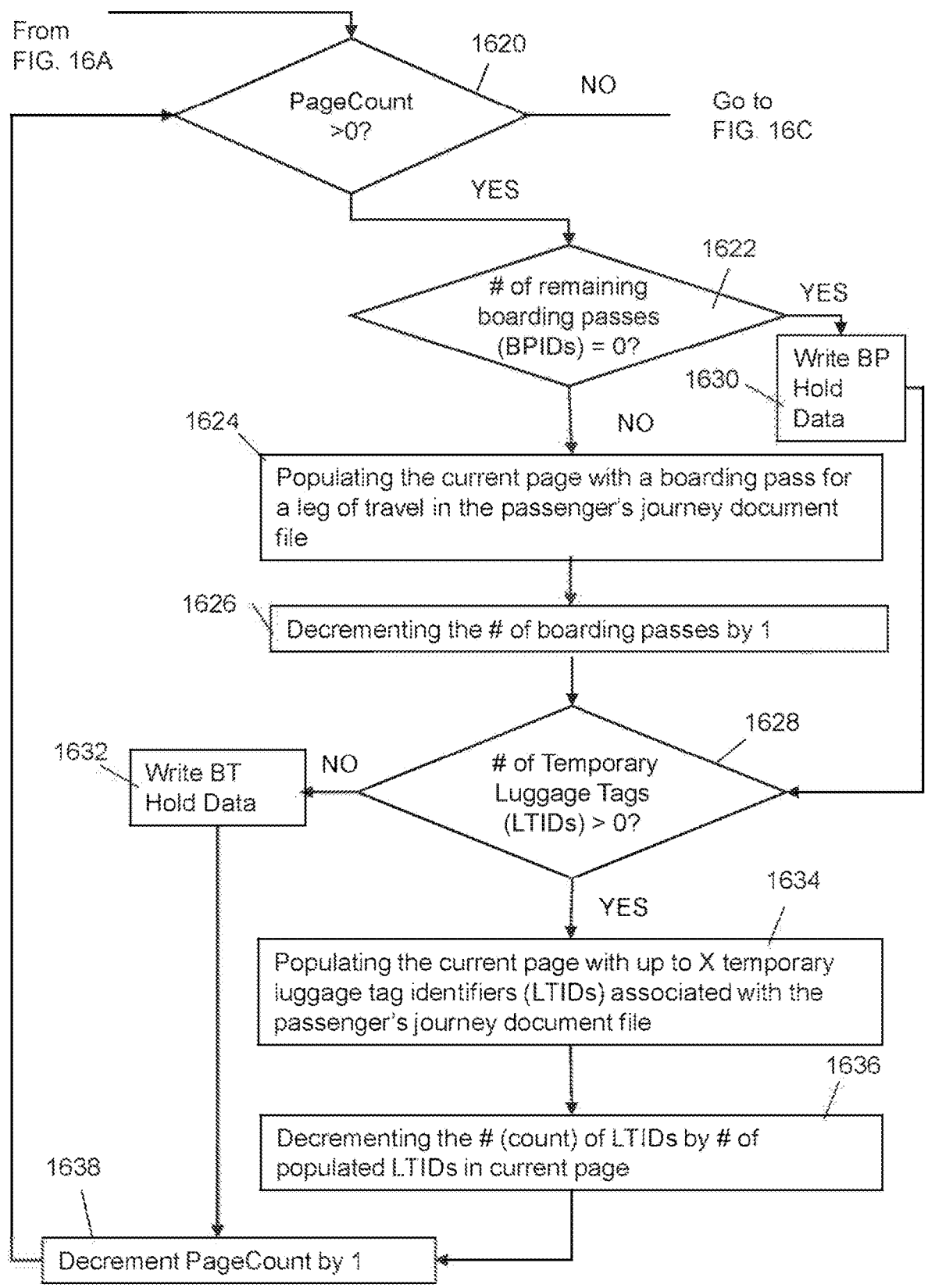
Figure 16C:
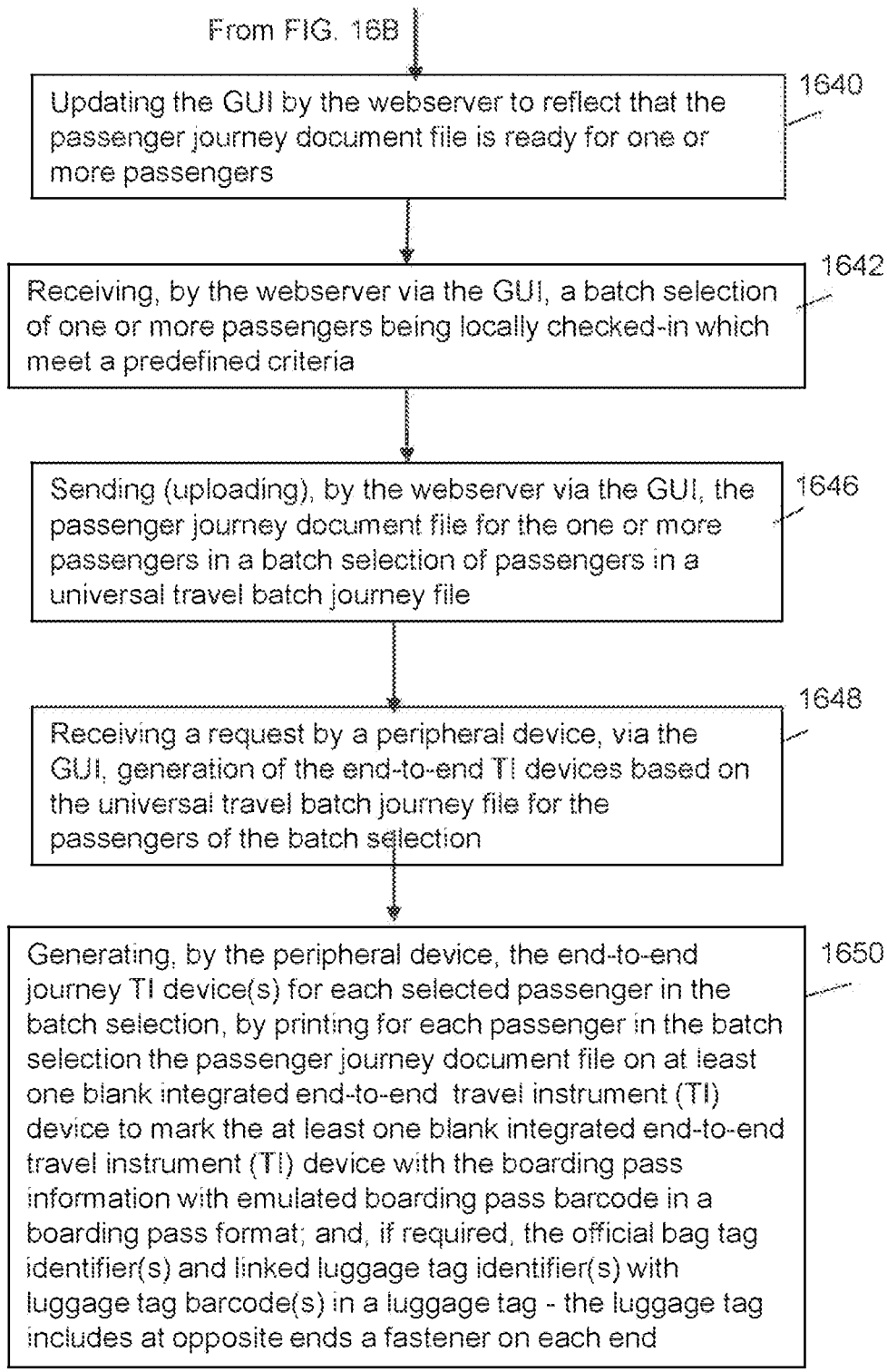

FIGS. 16A-16C illustrate a flowchart for generating integrated end-to-end travel instruments during a check-in period.

The method 1600 may comprise, at block 1602, retrieving, by the webserver 112, a passenger's information record including, end-to-end journey information, the official BPID, and, if any, official BTID and the linked temporary LTID for each luggage item to be checked-in with a THS associated with a passenger. The method 1600 may comprise, at block 1604, saving for the one or more passengers, the retrieved passenger's information record in a database in memory. The method 1600 may comprise, at block 1606, receiving selection of via the client device using the GUI, one or more passengers for generation of their integrated end-to-end travel instrument devices during a passenger check-in period.

The method 1600 may comprise, at block 1608, determining, by the webserver 112, based on each THS ID, for example, the customized THS template(s) for generation of the integrated end-to-end TI devices for each of the one or more passengers. The method 1600 may comprise, at block 1610, determining a page count for each integrated end-to-end TI device based on at least one of the end-to-end journey information (number of official BPIDs), official BTID and the number of temporary LTIDs needed for a corresponding passenger.

The method 1600 may comprise, at block 1612, a setting page count for passenger's journey document file (PJDF) 160 used to create the integrated end-to-end TI devices. The method 1600 may comprise, at block 1614, populating a first page with data representative of a first boarding pass for a first leg of travel for the generation of the integrated end-to-end TI devices.

With reference to FIG. 16B, at block 1620, a determination is made whether PageCount is>0? If the determination at block 1620 is "NO," the method 1600 may advance to FIG. 16C. However, if the determination at block 1620 is "YES," the method 1600 may advance to block 1622. The method 1600 may comprise, at block 1622, determining whether the number # of remaining boarding passes is equal (=) to 0. If the determination at block 1622 is "YES," the method 1600 may advance to block 1630 where the BPHold data is written and may proceed to block 1628.

The method 1600 may comprise, at block 1628, determining whether the number # of LTIDs>0. If the determination is "YES," then the method 1600 may, at block 1634, include populating the current page of the passenger's journey document file with up to X temporary luggage tag identifiers (LTIDs) associated with the first boarding pass of the passenger's journey file.

The method 1600 may comprise, at block 1636, decrementing the number # of temporary LTIDs by the number # of populated LTIDs in current page. The method 1600 may comprise, at block 1638, decrementing the page count by 1 and return to block 1620. Returning to block 1628, if the determination is "NO," then at block 1632, the BTHold data is written. Block 1632 advances to block 1638.

Returning again to block 1622, if the determination is "NO," then at block 1624, the method may include populating the current page of the passenger's journey document file with a boarding pass for a leg of travel in the passenger's journey document file. The "next" boarding pass may be for the same (first) THS as the previous boarding pass or different (second) THS. If the "next" boarding pass is associated with a different second THS, the data represented as the boarding pass may be formed using the integrated end-to-end TI template customized for the second THS. However, in some embodiments, the data representative of the LTIDs populated on the next page with the additional boarding pass may use the template format of the first THS, for the luggage tag generation while the boarding pass may use a different template. At block 1626, the method 1600 may decrement the count of boarding passes by 1. Block 1626 may proceed to block 1628, previously described.

The GUI 1400 may be updated by the webserver to reflect that the documents are ready for one or more passengers, at block 1640. The GUI may display an indicator that the formatted data representative of the integrated end-to-end travel instruments are ready/available for each passenger record.

At block 1646, the method 1600 may comprises sending (uploading), by the webserver via the GUI, the passenger's journey document file for the one or more passengers in a batch selection being checked-in to form a master travel batch journey file. The method 1600 may comprise, at block 1648, receiving by a peripheral device, via the GUI by the client device, a request for generation of the integrated end-to-end travel instrument devices based on the master travel batch journey file for one or more passengers in the batch selection.

The method 1600 may comprise, at block 1650, generating, by the peripheral device, the integrated end-to-end TI device(s) for each selected passenger in the batch selection, by printing for each selected passenger the corresponding passenger journey document file on at least one blank integrated end-to-end travel instrument (TI) device to mark the at least one blank integrated end-to-end travel instrument (TI) device with the boarding pass information with emulated boarding pass barcode in a boarding pass format; and, if required, the official boarding pass identifier(s) and linked luggage tag identifier(s) with luggage tag barcode(s) in a luggage tag format to form the boarding pass instrument and the luggage tag devices on a single-sheet integrated medium. The temporary luggage tag includes at opposite ends a fastener on each end to form a luggage tag device. The client device may be remote from or out of network from the THS. By way of non-limiting example, a passenger may only require a boarding pass instrument. The formatted data representative of the integrated end-to-end travel instruments would only include data for one instrument which would be the boarding pass instrument which when printed may become a boarding pass instrument device. If the formatted data representative of the integrated end-to-end travel instruments also includes at least one temporary LTID, then when printed a boarding pass instrument device and at least one luggage tag device may be created on the single-sheet integrated medium. The boarding pass instrument device and the at least one luggage tag device may be configured to be separated from the other. The luggage tag device may be configured to loop around a handle of luggage and the ends of the loop affixed together by a fastener, such as adhesive. Because a passenger journey document file may include multiple boarding pass instruments and/or more than X luggage tags, additional single-sheet integrated mediums may be needed to form all travel instruments to complete a journey end-to-end, in some embodiments. The single-sheet integrated medium supports a boarding pass for one leg of travel and up to X temporary luggage tags for luggage items to be checked-in.

The forming of the integrated end-to-end journey TI device(s) may be performed for each selected passenger who is checked-in for their travel reservation(s) in a check-in period.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The inventors have determined that the processes described herein may use a laser-jet printer for printing instead of AEA printers. Laser-jet printers are significantly cheaper than AEA printers and in many cases already available. Additionally, laser-jet printers require less training of agents and technical support for printing. The laser-jet printers may have a much faster throughput which may dramatically reduce the print time.

The envelope stuffing process may be eliminated. This greatly reduces the time and labor hours required by agents during the travel instrument printing process. Additionally, the integrated travel instrument may reduce the risk of human error by having all of a passenger's documents contained in a single sheet.

In view of the above, embodiments herein include a system (i.e., client-side HCI system 140) for computer-assisted generation of integrated passenger set of separable master travel instrument (MTI) devices for disembarking passengers. The passengers may be identified in a predetermined passenger list and travel to a plurality of final destinations using a plurality of distinct journey travel host systems (JTHS). The predetermined passenger list may include the entire manifest or part of the manifest.

The term "master travel instrument devices" as used herein refers to the client system's ability to create boarding passes according to each distinct journey travel host system's individualized format(s). For example, each airline may use a distinct boarding pass object format. A first MTI device of the set includes an official boarding pass ID (BPID) and emulated boarding pass barcode according to the JTHS individualized format/template of the JTHS issuing the official BPID. In some cases, the JTHS may not have a customized/individualized format. In this case, a default boarding pass format will be used. The "master travel instrument devices" as used herein refers to the system's ability to create customized boarding passes and alternately, default boarding passes for a master set of JTHS.

The system 140 comprises a local client device 142 having at least one processor and tangible, non-transitory computer program memory storing instructions (program code) of a master check-in end-to-end passenger travel reservation (PTR) tool. The PTR tool is represented as a graphical user interface (GUI) 1400.

The instructions (program code) of the PTR tool, when executed by the at least one processor, may upload and display a graphical user interface (GUI) 1400 including a passenger travel reservation (PTR) record of each disembarking passenger in the predetermined passenger list.

The instructions (program code) of the PTR tool, when executed by the at least one processor, may display, on the GUI 1400, for each PTR record, a first status representative of a remote master check-in reservation (RMCIR) status of an end-to-end PTR (E2EPTR) and a second status of availability of a passenger journey document (PJD) file for download from the remote webserver. The RMCIR status may be updated on the GUI 1400 based on a preset parameter for the generation of the integrated passenger set of separable MTI devices for the predetermined passenger list. The preset parameter may include "checked-in" status, 48-hour status or 24-hour status.

The instructions (program code) of the PTR tool, when executed by the at least one processor, may cause a change in the displayed GUI 1400 representative of an update to the RMCIR status, in response to receiving from the remote webserver data indicative of completion of a remote master check-in process. The remote master check-in process may be configured to obtain an official boarding pass identifier (BPID) for each travel leg of the E2EPTR to a final destination. In addition to the BPID, N alphanumeric value of official baggage tag identifiers (BTIDs) may be obtained, wherein N is an alphanumeric value representative of a number of passenger luggage items to be checked-in represented in numeric values and/or alphabetical values. For example, alphanumeric value N may be O or null if no items are to be checked-in. The RMCIR status when updated may reflect the preset parameter.

The instructions (program code) of the PTR tool, when executed by the at least one processor, may communicate with a remote webserver, using the GUI 1400, data representative of a single batch selection of a plurality of disembarking passengers, in response to a batch selection command received by the GUI 1400 for those PTR records with the updated RMCIR status meeting the preset parameter. The batch selection may be a filtered batch selection for those PTR records including the RMCIR status which may meet the preset parameter.

The instructions (program code) of the PTR tool, when executed by the at least one processor, may download, from the webserver, a master travel journey file having a batch of assembled passenger journey document (APJD) files (i.e., PJDF) 160. Each respective one APJD file corresponds to a respective one disembarking passenger identified in the batch selection. Each respective one APJD file may include data indicative the official boarding pass identifier (BPID) for each travel leg via at least one journey travel host system (JTHS) to the final destination of the E2EPTR. The APJD file may include the N alphanumeric value of the official baggage tag identifiers (BTIDs). In some embodiments, the N alphanumeric value may have an alphanumeric value. For example, instead of 0, the N alphanumeric value may have a value of null.

The instructions (program code) of the PTR tool, when executed by the at least one processor, may, after the master journey document file may be downloaded, cause the computer-assisted generation of integrated passenger set of separable master travel instrument (MTI) devices, using data in the master journey document file, in response to a single request command to initiate the generation received by the GUI 1400. The computer-assisted generation may be in response to a single request received by the GUI 1400 to start the computer-assisted generation of the MTI devices for all passengers in the batch selection. In other words, the MTI devices may be generated for only those passengers in the passenger list identified in the batch selection without regard to the different and distinct boarding pass objects for the different and distinct JTHSs.

The integrated passenger set of the separable MTI devices of a respective one PTR record includes, for each travel leg to the final destination, a first MTI device having an official checked-in boarding pass identifier (BPID) and emulated boarding pass barcode customized for the JTHS in the E2EPTR. The emulated boarding pass barcode may be electronically recognizable by the JTHS which issued the BPID. If the passenger has zero luggage items to check-in, then no second MTI devices may be required for the passenger set. The integrated passenger set of separable MTI devices may include integrated passenger subsets, wherein each integrated subset includes at least one of a second distinct official BPID and up to X additional official BTIDs. For example, for two (2) travel legs (hops), three BPIDs may be required. Furthermore, each hop of the two (2) travel legs to the final destination may use two different and distinct JTHSs for travel modes. Thus, the subsets may have customized first MTI devices according to distinct boarding pass object formats individualized for the corresponding JTHS of each distinct leg. There is a one to one correspondence between a single boarding pass object and a single-sheet page count.

The number of subsets in the integrated passenger set of the separable MTI devices may be a function of NIX rounded up to the next integer. If the passenger has luggage items to check, then up to X second MTI devices may be generated for incorporation into the first subset. The second subset may include any remaining LTIDs up to X. In some embodiments, a first set, of up to X second MTI devices, may be integrated with the first MTI for the first BPID corresponding to the first travel leg. The number X is a non-zero integer corresponding to a maximum number of X distinct second MTI device sections in the single sheet paired with a single BPID.

The first MTI device may be integrated with up to N official BTIDs. Each second MTI device includes a temporary luggage tag identifier (LTID) linked to an official BTID and LTID barcode wherein there is a one-to-one correspondence between the LTID and the official BTID.

A single sheet may be used for a respective one subset of integrated passenger sets. The single sheet defines an individualized template including a single (only one) section for the creation of the first MTI device. The first MTI device and/or up to X second MTI devices generated on a single sheet are generated in a manner such that the first MTI device and each second MTI device of a set or subset are individually separable from each other on a single sheet, after generation. The single sheet includes a first mechanism integrated into the single sheet which allows the first MTI device to be separated from the second MTI devices. The single sheet includes a second mechanism integrated into the single sheet which allows the up to X second MTI devices to be separated from each other to form separated luggage tag devices. The first mechanism and the second mechanism may include perforations.

The instructions (program code) of the PTR tool, when executed by the at least one processor, may cause a change, in each PTR record in the displayed GUI, representative of an update to a status of the MTI devices to indicate completion of the generation of integrated passenger set of the separable MTI devices associated with the passenger. By way of non-limiting example, an indication representative of "printed" on the GUI may provide a status representative of completion of the generation of the integrated passenger sets. Each generated second MTI device includes a tangible substrate with opposite ends configured to be affixed together using an attachment mechanism and forms a luggage tag device to be affixed to a luggage item.

The APJD file comprises at least one master single-sheet integrated JTHS travel instrument (TI) template, each master single-sheet JTHS TI template includes only one designated boarding pass section (i.e., first MTI device section) in which a customized boarding pass object for the distinct JTHS issuing the official BPID may be formatted. The boarding pass object may be populated with the official BPID and emulated BPID barcode. The webserver may be configured to determine a page count value. The page count value may be calculated as a function of the number of BPIDs needed for the E2EPTR to reach the final destination.

The master single-sheet JTHS TI template comprises X LTID sections. Each LTID section formats the LTID section with a luggage tag object for populating a corresponding one temporary LTID and LTID barcode. The page count value may be calculated as a function of the number of N of passenger luggage items to be checked-in relative to the maximum number X of luggage tag sections on the single sheet.

The master travel journey file may be a single file document. The master travel journey file may be an assembly of a batch of APJD files associated with each passenger identified in the batch selection without regard to the customized boarding pass object for each different and distinct JTHS of a master set of distinct JTHSs. Even if a JTHS does not have a customized boarding pass object, the server uses a default boarding pass object. Thus, the master travel journey file may be arranged such that a single peripheral device coupled to the local client device may cause serial generation of the set of the MTI devices, for each passenger in the batch selection, using the ordered arrangement of the PTR records as a function of the order of the PTR records in the batch selection. The serial generation may be initiated based on a single request command to cause the peripheral device to print the master travel journey file on the blank integrated end-to-end travel instrument (TI) devices 146. This effectuates computer-assisted generation of an integrated passenger set of separable master travel instrument (MTI) devices, for each disembarking passenger in the batch selection.

An embodiment may include a server including instructions which when executed by a server processor to cause the server processor to provide a PRT tool (i.e., GUI 1400) from which a local client device may initiate computer-assisted generation of an integrated passenger set of separable master travel instrument (MTI) devices, for disembarking passengers. The method may comprise setting a preset parameter for the generation of the integrated passenger set of separable MTI devices for a predetermined passenger list. The preset parameter may limit a duration of time in advance of travel on a distinct JTHS for which generation of the integrated passenger set of separable master travel instrument (MTI) devices may be initiated.

The method may comprise providing, by a server, a local check-in end-to-end passenger travel reservation (PTR) tool to a local client computing device. The PTR tool comprises a graphical user interface (GUI) configured to display a passenger travel reservation (PTR) record associated with each disembarking passenger in the predetermined passenger list. The PTR record includes data indicative of passenger information, at least one travel leg using at least one distinct journey travel host system (JTHS) to a final destination, an alphanumeric value N of passenger bags to check-in, and at least one of a remote check-in reservation (CIR) status of the at least one travel leg, status of availability of a passenger journey document (PJD) file assembled by a remote server and status of locally generated integrated end-to-end master travel instrument (MTI) devices. The PTR record may include a number of boarding passes needed for the passenger to reach their final destination using at least one distinct JTHS.

The method may include receiving, by the server, at least one official BPID issued by at least one distinct JTHS and/or at least one official BTID issued by a distinct JTHS, wherein the at least on official BPID and/or at least one official BTID being issued in response to a remote check-in process. The remote check-in process may be performed by a different server with one or more processors configured to perform the remote check-in process to obtain the official BPID and official BTIDs.

The method may include receiving, by the server, the selected batch of passengers to initiate a download process of a master travel journey file including an assembled PJD file for each passenger in the selected batch. The method may include assembling, by the server, the assembled PJD file for each passenger in the selected batch.

The assembling of a PJDF, by the server, uses a master travel instrument integration process. The master travel instrument integration process for assembling the PJDF may comprise determining a number of boarding passes for an end-to-end PTR (E2EPTR) to a final destination associated with the PTR record. In some embodiments, the PTR tool (i.e., GUI 1400) may be updated with the number of official BPIDs issues for the passenger.

The assembling may comprise determining, by the server, an alphanumeric value N of passenger luggage items to check-in and calculating, by the server, and a single-sheet template page count for the PJD file of a passenger based on the number of boarding passes, the alphanumeric value N relative to a maximum number X of distinct temporary luggage tag identifier (LTID) zones in a single-sheet template used to generate of the integrated passenger set of separable master travel instrument (MTI) devices.

For at least one travel leg of the E2EPTR, the method may include determining, by the server, at least one distinct JTHS for the E2EPTR. The method may include retrieving, by the server, the single-sheet template to formulate a customized image or drawing representative of the integrated passenger set of separable master travel instrument (MTI) devices associated with the determined distinct JTHS issuing an official BPID associated with the PTR record. The method may include retrieving, by the server, if the value N is greater than 0, X number of official baggage tag identifiers (BTIDs) issued by the determined distinct JTHS.

The method may include formulating, by the server, in the single-sheet template a distinct JTHS boarding pass object for the determined distinct JTHS, including populating the official BPID, and an emulated BPID barcode for the determined distinct JTHS, to create a customized image or drawing of a boarding pass electronically recognizable by the determined distinct JTHS. The boarding pass object may include official BTIDs issued by the distinct JTHS.

The formulating, by the server, if the value N is greater than 0, up to X temporary luggage tag objects in up to X distinct temporary luggage tag identifier (LTID) zones of the single-sheet template, each luggage tag object including a respective one temporary luggage tag identifier (LTID) and a LTID barcode to create a customized image or drawing of a temporary luggage tag. There is a one-to-one correspondence between each official BTID and temporary LTID.

The method repeats the formulating, by the server, to formulate each subsequent next page in the page count, wherein the formulating of the subsequent next page includes at least one of: a) formulating a distinct JTHS boarding pass object for the determined distinct JTHS for a next leg of travel; and b) formulating up to X temporary luggage tag objects for any remaining official BTIDs. The method includes inserting in the master travel journey file the assembled PJDF in an ordered arrangement corresponding to the ordered arrangement of PTR records in the selected batch.

The method may include communicating, by the server, to the local client computing device the master travel journey file. In some embodiments, the master travel journey file may be sent to the local client computing device with all assembled PJD files for each passenger in the selected batch.

The method may include updating, by the server, the status of the availability of the assembled journey document (PJD) file displayed by the GUI on the local client device.

The method may include updating, by the server, the check-in reservation (CIR) status in each PTR record displayed by the GUI on the local client device. The CIR status may be based on a determination made whether data in the PTR record satisfies a predetermined condition associated with the preset parameter, for each passenger in the selected batch.

The CIR status may be updated in response to the server receiving the official BPID from the issuing JTHS and/or the official BTID.

The method may include receiving, by a peripheral device, a command via the GUI, indicative of a single request to initiate the computer-assisted generation of all integrated passenger set of master travel instrument (MTI) devices in the master travel journey file of the selected batch by a peripheral device. The peripheral device is in communication with the local client device and prints the MTI devices without regard to different and distinct JTHS boarding pass objects formatted in the master travel journey file.

The method may include changing the status indicative of the generation of the locally generated integrated passenger set of the separable master travel instrument (MTI) devices in each PTR record, in the selected batch.

The methods described herein for the generation of the integrated passenger set of separable master travel instrument (MTI) devices on a single sheet for any one passenger is performed by a single peripheral device. While a printed batch may use multiple printers, a single set of MTI devices for a single passenger does not require different dedicated peripheral devices for its generation.

The terminology used herein is for the purpose of describing particular embodiments only and is not intended to be limiting. As used herein, the singular forms "a," "an," and "the" may be intended to include the plural forms as well, unless the context clearly indicates otherwise. Furthermore, to the extent that the terms "including," "includes," "having," "has," "with," or variants thereof may be used in either the detailed description and/or the claims, such terms may be intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein may be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system, comprising:
a passenger travel reservation (PTR) tool comprising a graphical user interface (GUI) displayed on a display device, the PTR tool configured to: upload at least one PTR associated with at least one passenger, display a list comprising the at least one PTR and at least one travel reservation status associated with at least one travel host system (THS), and receive a user selection comprising the at least one passenger; and
a server comprising at least one processor configured to:
generate a passenger journey document file (PJDF) comprising the at least one PTR for the at least one passenger, the PJDF including, for a first travel leg of the at least one PTR, an integrated travel instrument (TI) populated with at least one boarding pass identifier (BPID) for the at least one passenger issued by the at least one THS associated with the first travel leg;
populate a first TI template with a first BPID;
populate at least one temporary luggage tag identifier (LTID) linked to up to at least one retrieved bag tag identifier (BTID) issued by the at least one THS of the first travel leg;
update the at least one travel reservation status in the GUI to reflect that the generated PJDF is ready for the at least one passenger;
populate at least one supplemental single-sheet integrated TI template with at least one of another BPID of a second travel leg subsequent to the first travel leg with luggage tag information corresponding to one or more remaining LTIDs linked to one or more remaining BTIDs; and
assemble the PJDF of the respective at least one passenger to include the first TI template and the at least one supplemental single-sheet integrated TI template, wherein at least one set of the single-sheet integrated TI template comprises a boarding pass designated section and X luggage tag designated sections and wherein a non-zero integer X is equal to 2, and wherein the GUI is configured to generate a request to a peripheral device for computer-assisted generation of the integrated TI devices, wherein at least one of the integrated TI devices corresponding to at least one locally checked-in passenger comprises:
a boarding pass instrument having printed, on a first layer of a respective one of the at least one set of the single-sheet integrated TI template in the boarding pass designated section, passenger information, the BPID, emulated code, and the BTID;
a first temporary luggage tag device (FLTD), detachable coupled to the boarding pass instrument via first perforations, having printed in a first luggage tag designated section a first LTID, a first LTID code and the passenger information; and
a second luggage tag device (SLTD), detachable coupled to the first temporary luggage tag device via second perforation, having printed in a second luggage tag designated section a second LTID, a second LTID code and the passenger information,
wherein
the FLTD comprises a first adhesive for selectively adhering together opposite ends of the FLTD to attach the FLTD to a first luggage item; and
the SLTD comprises a second adhesive for selectively adhering together opposite ends of the SLTD to attach the SLTD to a second luggage item.

2. The system of claim 1, wherein the integrated TI is a populated single-sheet template and wherein the PTR is further configured for a local check-in of the at least one passenger and wherein the travel leg is a first travel leg, and the server comprising the at least one processor is further configured to, when generating the PJDF of the PTR:

determine a page count of the PJDF of the at least one passenger based on a value of NIX and the at least one BPID for the at least one passenger;

populate a first TI template with a first BPID;

associate an emulated code with the first BPID for the first travel leg;

populate at least one X temporary luggage tag identifier (LTID) linked to up to at least one X retrieved bag tag identifier (BTID) issued by the at least one THS of the first travel leg, wherein X is a non-zero integer number, N is an integer number, and there is a one-to-one correspondence between the at least one LTID and the at least one BTID;

populate at least one supplemental single sheet integrated TI template with at least one of another BPID of a second travel leg subsequent to the first travel leg with an emulated code of the second travel leg and luggage tag information corresponding to one or more remaining LTIDs linked to one or more remaining BTIDs, wherein the determined page count is greater than 1; and assemble the PJDF of the respective at least one passenger to include the first TI template and the at least one supplemental single sheet integrated TI template.

3. The system of claim 2, further comprising a computing system comprising at least one processor being configured to check-in the at least one passenger from a first set of passengers, wherein the computing system is further configured to:

for each travel leg of a PTR associated with at the at least one passenger of the first set of passengers, communicate a request to the corresponding THS;

for each travel leg of the PTR, extract from the corresponding THS, the at least one BPID for the at least one passenger issued by the corresponding THS;

communicate a luggage item check-in request for the N luggage items, if the integer number N is greater than zero;

extract the at least one BTID associated with the luggage item check-in request; and generate and link up the at least one LTID for and to the at least one BTID.

4. The system of claim 2, wherein the populated single-sheet template is generated at least in part from an unpopulated single-sheet integrated TI template comprising a boarding pass designated section and up to X luggage tag designated sections and the server is further configured to:

look-up the unpopulated single-sheet integrated TI template associated with the corresponding THS in a database, based on a corresponding THS identifier for the corresponding travel leg; and autonomously create a file of the generated PJDF for the at least one passenger.

5. The system of claim 1, wherein the at least one passenger is part of a first set of passengers associated with a group identifier, and wherein the GUI is configured to filter the least one passenger to display, via the GUI, the first set of passengers.

6. The system of claim 1, further configured to print the at least one passenger journey document file on the respective one of the single-sheet integrated TI template, wherein the first layer of a single-sheet integrated medium is tear proof other than along at least the first and second perforations.

7. A non-transitory computer-readable medium having stored thereon instructions which, when executed by at least one processor, cause the at least one processor to:

generate a passenger journey document file (PJDF) comprising at least one PTR for the at least one passenger, the PJDF including, for a first travel leg of the at least one PTR, an integrated travel instrument (TI) populated with at least one boarding pass identifier (BPID) for the at least one passenger issued by at least one travel host system (THS) associated with the first travel leg;

populate a first TI template with a first BPID;

populate at least one temporary luggage tag identifier (LTID) linked to up to at least one retrieved bag tag identifier (BTID) issued by the at least one THS of the first travel leg;

update at least one travel reservation status in a GUI to reflect that the generated PJDF is ready for the at least one passenger;

populate at least one supplemental single-sheet integrated TI template with at least one of another BPID of a second travel leg subsequent to the first travel leg with luggage tag information corresponding to one or more remaining LTIDs linked to one or more remaining BTIDs; and assemble the PJDF of the respective at least one passenger to include the first TI template and the at least one supplemental single-sheet integrated TI template, wherein at least one set of the single-sheet integrated TI template comprises a boarding pass designated section and X luggage tag designated sections and wherein X is equal to 2, and wherein the GUI is configured to generate a request to a peripheral device for computer-assisted generation of the integrated TI devices, wherein at least one of the integrated TI devices corresponding to at least one locally checked-in passenger comprises:

a boarding pass instrument having printed, on a first layer of a respective one of the at least one set of the single-sheet integrated TI template in the boarding pass designated section, passenger information, the BPID, emulated code, and the BTID;

a first temporary luggage tag device (FLTD), detachable coupled to the boarding pass instrument via first perforations, having printed in a first luggage tag designated section a first LTID, a first LTID code and the passenger information; and a second luggage tag device (SLTD), detachable coupled to the first temporary luggage tag device via second perforation, having printed in a second luggage tag designated section a second LTID, a second LTID code and the passenger information, wherein the FLTD comprises a first adhesive for selectively adhering together opposite ends of the FLTD to attach the FLTD to a first luggage item; and the SLTD comprises a second adhesive for selectively adhering together opposite ends of the SLTD to attach the SLTD to a second luggage item.

8. The non-transitory computer-readable medium of claim 7, wherein the integrated TI is a populated single-sheet template and wherein the PTR is further configured for a local check-in of the at least one passenger and wherein the travel leg is a first travel leg, and wherein the at least one processor is further configured, when generating the PJDF of the PTR, to:
- determine a page count of the PJDF of the at least one passenger based on a value of NIX and the at least one BPID for the at least one passenger;
- populate a first TI template with a first BPID;
- associate an emulated code with the first BPID for the first travel leg;
- populate at least one X temporary luggage tag identifier (LTID) linked to up to at least one X retrieved bag tag identifier (BTID) issued by the at least one THS of the first travel leg, wherein X is a non-zero integer number, N is an integer number, and there is a one-to-one correspondence between the at least one LTID and the at least one BTID;
- populate at least one supplemental single sheet integrated TI template with at least one of another BPID of a second travel leg subsequent to the first travel leg with an emulated code of the second travel leg and luggage tag information corresponding to one or more remaining LTIDs linked to one or more remaining BTIDs, wherein the determined page count is greater than 1; and
- assemble the PJDF of the respective at least one passenger to include the first TI template and the at least one supplemental single sheet integrated TI template.

9. The non-transitory computer-readable medium of claim 8, wherein the at least one processor is further configured to:
- check-in the at least one passenger from a first set of passengers;
  - for each travel leg of a PTR associated with at the at least one passenger of the first set of passengers, communicate a request to the corresponding THS;
  - for each travel leg of the PTR, extract from the corresponding THS, the at least one BPID for the at least one passenger issued by the corresponding THS;
  - communicate a luggage item check-in request for N luggage items, if the integer number N is greater than zero;
  - extract the at least one BTID associated with the luggage item check-in request; and
  - generate and link up the at least one LTID for and to the at least one BTID.

10. The non-transitory computer-readable medium of claim 8, wherein the populated single-sheet template is generated at least in part from an unpopulated single-sheet integrated TI template comprising a boarding pass designated section and up to X luggage tag designated sections and the at least one processor is further configured to:
- look-up the unpopulated single-sheet integrated TI template associated with the corresponding THS in a database, based on a corresponding THS identifier for the corresponding travel leg; and
- autonomously create a file of the generated PJDF for the at least one passenger.

11. The non-transitory computer-readable medium of claim 7, wherein the at least one passenger is part of a first set of passengers associated with a group identifier, and wherein the GUI is configured to filter the least one passenger to display, via the GUI, the first set of passengers.

12. The non-transitory computer-readable medium of claim 7, wherein the at least one processor is further configured to print the at least one passenger journey document file on the respective one of the single-sheet integrated TI template, wherein the first layer of a single-sheet integrated TI template is tear proof other than along at least the first and second perforations.

13. The non-transitory computer-readable medium of claim 7, wherein the at least one processor is further configured to print the at least one passenger journey document file on the respective one of the single-sheet integrated TI template, wherein the first layer of a single-sheet integrated TI template is tear proof other than along at least the first and second perforations.

14. A method comprising:
- generating a passenger journey document file (PJDF) comprising at least one PTR for the at least one passenger, the PJDF including, for a first travel leg of the at least one PTR, an integrated travel instrument (TI) populated with at least one boarding pass identifier (BPID) for the at least one passenger issued by at least one travel host system (THS) associated with the first travel leg;
- populating a first TI template with a first BPID;
- populating at least one temporary luggage tag identifier (LTID) linked to up to at least one retrieved bag tag identifier (BTID) issued by the at least one THS of the first travel leg;
- updating at least one travel reservation status in a GUI to reflect that the generated PJDF is ready for the at least one passenger;
- populating at least one supplemental single-sheet integrated TI template with at least one of another BPID of a second travel leg subsequent to the first travel leg with luggage tag information corresponding to one or more remaining LTIDs linked to one or more remaining BTIDs; and
- assembling the PJDF of the respective at least one passenger to include the first TI template and the at least one supplemental single-sheet integrated TI template, wherein at least one set of the single-sheet integrated TI template comprises a boarding pass designated section and X luggage tag designated sections and wherein X is equal to 2, and wherein the GUI is configured to generate a request to a peripheral device for computer-assisted generation of the integrated TI devices, wherein at least one of the integrated TI devices corresponding to at least one locally checked-in passenger comprises:
- a boarding pass instrument having printed, on a first layer of a respective one of the at least one set of the single-sheet integrated TI template in the boarding pass designated section, passenger information, the BPID, emulated code, and the BTID;
- a first temporary luggage tag device (FLTD), detachable coupled to the boarding pass instrument via first perforations, having printed in a first luggage tag designated section a first LTID, a first LTID code and the passenger information; and
- a second luggage tag device (SLTD), detachable coupled to the first temporary luggage tag device via second perforation, having printed in a second luggage tag designated section a second LTID, a second LTID code and the passenger information, wherein
- the FLTD comprises a first adhesive for selectively adhering together opposite ends of the FLTD to attach the FLTD to a first luggage item; and
- the SLTD comprises a second adhesive for selectively adhering together opposite ends of the SLTD to attach the SLTD to a second luggage item.

15. The method of claim 14, wherein the integrated TI is a populated single-sheet template and wherein the PTR is further configured for a local check-in of the at least one passenger and wherein the travel leg is a first travel leg, and wherein generating the PJDF of the PTR further comprises:
- determine a page count of the PJDF of the at least one passenger based on a value of NIX and the at least one BPID for the at least one passenger;
- populate a first TI template with a first BPID;
- associate an emulated code with the first BPID for the first travel leg;
- populate at least one X temporary luggage tag identifier (LTID) linked to up to at least one X retrieved bag tag identifier (BTID) issued by the at least one THS of the first travel leg, wherein X is a non-zero integer number, N is an integer number, and there is a one-to-one correspondence between the at least one LTID and the at least one BTID;
- populate at least one supplemental single sheet integrated TI template with at least one of another BPID of a second travel leg subsequent to the first travel leg with an emulated code of the second travel leg and luggage tag information corresponding to one or more remaining LTIDs linked to one or more remaining BTIDs, wherein the determined page count is greater than 1; and
- assemble the PJDF of the respective at least one passenger to include the first TI template and the at least one supplemental single sheet integrated TI template.

16. The method of claim 15, further comprising:
- checking-in the at least one passenger from a first set of passengers;
- for each travel leg of a PTR associated with at the at least one passenger of the first set of passengers, communicating a request to the corresponding THS;
- for each travel leg of the PTR, extracting from the corresponding THS, the at least one BPID for the at least one passenger issued by the corresponding THS;
- communicating a luggage item check-in request for N luggage items, if the integer number N is greater than zero;
- extracting the at least one BTID associated with the luggage item check-in request; and
- generating and link up the at least one LTID for and to the at least one BTID.

17. The method of claim 15, wherein the populated single-sheet template is generated at least in part from an unpopulated single-sheet integrated TI template comprising a boarding pass designated section and up to X luggage tag designated sections and the method further comprising:
- looking-up the unpopulated single-sheet integrated TI template associated with the corresponding THS in a database, based on a corresponding THS identifier for the corresponding travel leg; and
- autonomously creating a file of the generated PJDF for the at least one passenger.

* * * * *